US008688573B1

(12) United States Patent
Rukonic et al.

(10) Patent No.: US 8,688,573 B1
(45) Date of Patent: Apr. 1, 2014

(54) METHOD AND SYSTEM FOR IDENTIFYING A MERCHANT PAYEE ASSOCIATED WITH A CASH TRANSACTION

(71) Applicant: Intuit Inc., Mountain View, CA (US)

(72) Inventors: Marko Rukonic, San Jose, CA (US); Praveen Reddy Kasireddy, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/653,083

(22) Filed: Oct. 16, 2012

(51) Int. Cl.
*G06Q 40/00* (2012.01)

(52) U.S. Cl.
USPC .............................................. 705/39; 705/40

(58) Field of Classification Search
USPC ..................................................... 705/10–44
See application file for complete search history.

(56) References Cited

U.S. PATENT DOCUMENTS

| 5,530,438 | A | 6/1996 | Bickham et al. |
| 5,559,313 | A | 9/1996 | Claus et al. |
| 5,737,440 | A | 4/1998 | Kunkler |
| 5,878,337 | A | 3/1999 | Joao et al. |
| 6,908,031 | B2 | 6/2005 | Seifert et al. |
| 7,376,618 | B1 * | 5/2008 | Anderson et al. ................ 705/38 |
| 7,970,701 | B2 * | 6/2011 | Lewis et al. ...................... 705/38 |
| 8,175,897 | B2 * | 5/2012 | Lee et al. .......................... 705/4 |
| 8,244,629 | B2 * | 8/2012 | Lewis et al. ...................... 705/38 |
| 2002/0128917 | A1 | 9/2002 | Grounds |
| 2003/0061132 | A1 | 3/2003 | Yu et al. |
| 2004/0083134 | A1 | 4/2004 | Spero et al. |
| 2006/0031123 | A1 | 2/2006 | Leggett et al. |
| 2008/0140505 | A1 | 6/2008 | Romano et al. |
| 2008/0140576 | A1 * | 6/2008 | Lewis et al. ...................... 705/67 |
| 2009/0037461 | A1 | 2/2009 | Rukonic et al. |
| 2009/0094182 | A1 | 4/2009 | Najarian et al. |
| 2009/0222364 | A1 | 9/2009 | McGlynn et al. |
| 2009/0327134 | A1 | 12/2009 | Carlson et al. |
| 2010/0287099 | A1 * | 11/2010 | Liu et al. ......................... 705/44 |
| 2011/0093324 | A1 * | 4/2011 | Fordyce et al. ............ 705/14.27 |
| 2011/0112869 | A1 * | 5/2011 | Greak ................................ 705/4 |
| 2011/0264543 | A1 | 10/2011 | Taveau et al. |
| 2011/0282778 | A1 * | 11/2011 | Wright et al. ................... 705/38 |
| 2011/0302011 | A1 * | 12/2011 | Yoder et al. ................ 705/14.17 |
| 2013/0124263 | A1 * | 5/2013 | Amaro et al. ................ 705/7.34 |

OTHER PUBLICATIONS

Channakeshava, "Method and System for Improving Automatic Categorization of Financial Transactions," U.S. Appl. No. 13/193,445, filed Jul. 28, 2011.

(Continued)

*Primary Examiner* — Frantzy Poinvil
(74) *Attorney, Agent, or Firm* — Hawley Troxell Ennis & Hawley LLP; Philip McKay

(57) ABSTRACT

Cash transaction entry data indicating a consumer has conducted a cash transaction with an unidentified merchant payee is obtained and geo-location data associated with the cash transaction data is used identify potential merchant payees of the cash transaction. If more than one potential merchant payee is identified, data representing the potential merchant payees is analyzed using historical financial transaction data associated with the consumer, and/or products or services and operations data associated with the potential merchant payees, and/or historical financial transaction data associated with a community of consumers, including consumers other than the consumer, to generate a potential merchant payee probability score for each of the potential merchant payees. The potential merchant payee probability score for each of the potential merchant payees is then used to generate a prioritized potential merchant payee list for the cash transaction that includes at least one of the potential merchant payees.

26 Claims, 6 Drawing Sheets

(56) References Cited

OTHER PUBLICATIONS

Channakeshava, "Method and System for Automatically Obtaining and Categorizing Cash Transaction Data Using a Mobile Computing System," U.S. Appl. No. 13/272,946, filed Oct. 13, 2011.

Madhani, "Method and System for Semi-Automated Setup of Accounts within a Data Management System," U.S. Appl. No. 13/416,966, filed Mar. 9, 2012.

Madhani, "Method and System for Automated Classification and Categorization of Hardcopy Financial Transaction Records," U.S. Appl. No. 13/456,383, filed Apr. 26, 2012.

Channakeshava, "Method and System for Automatic Classification of Check and Cash Transactions by a Financial Management System," U.S. Appl. No. 13/752,041, filed Jan. 28, 2013.

* cited by examiner

METHOD AND SYSTEM FOR IDENTIFYING A MERCHANT PAYEE ASSOCIATED WITH A CASH TRANSACTION

SUMMARY

In accordance with one embodiment, a system and method for identifying a merchant payee associated with a cash transaction includes obtaining cash transaction entry data indicating a consumer has conducted a cash transaction with a merchant payee. In one embodiment, cash transaction geo-location data associated with the cash transaction data is obtained and any merchants located near the cash transaction geo-location are identified as potential merchant payees in the cash transaction.

In one embodiment, if more than one merchant is identified as a potential merchant payee, data representing the potential merchant payees and the cash transaction entry data are analyzed using historical financial transaction data associated with the consumer, and/or products or services and operations data associated with the potential merchant payees, and/or historical financial transaction data associated with the community of consumers, including consumers other than the consumer, to determine a potential merchant payee probability score for each of the potential merchant payees.

In one embodiment, the potential merchant payee probability score for each of the potential merchant payees is then used to generate a prioritized potential merchant payee list for the cash transaction that includes at least one of the potential merchant payees. In one embodiment, at least part of the prioritized potential merchant payee list for the cash transaction is then provided to the consumer.

Figure 1:
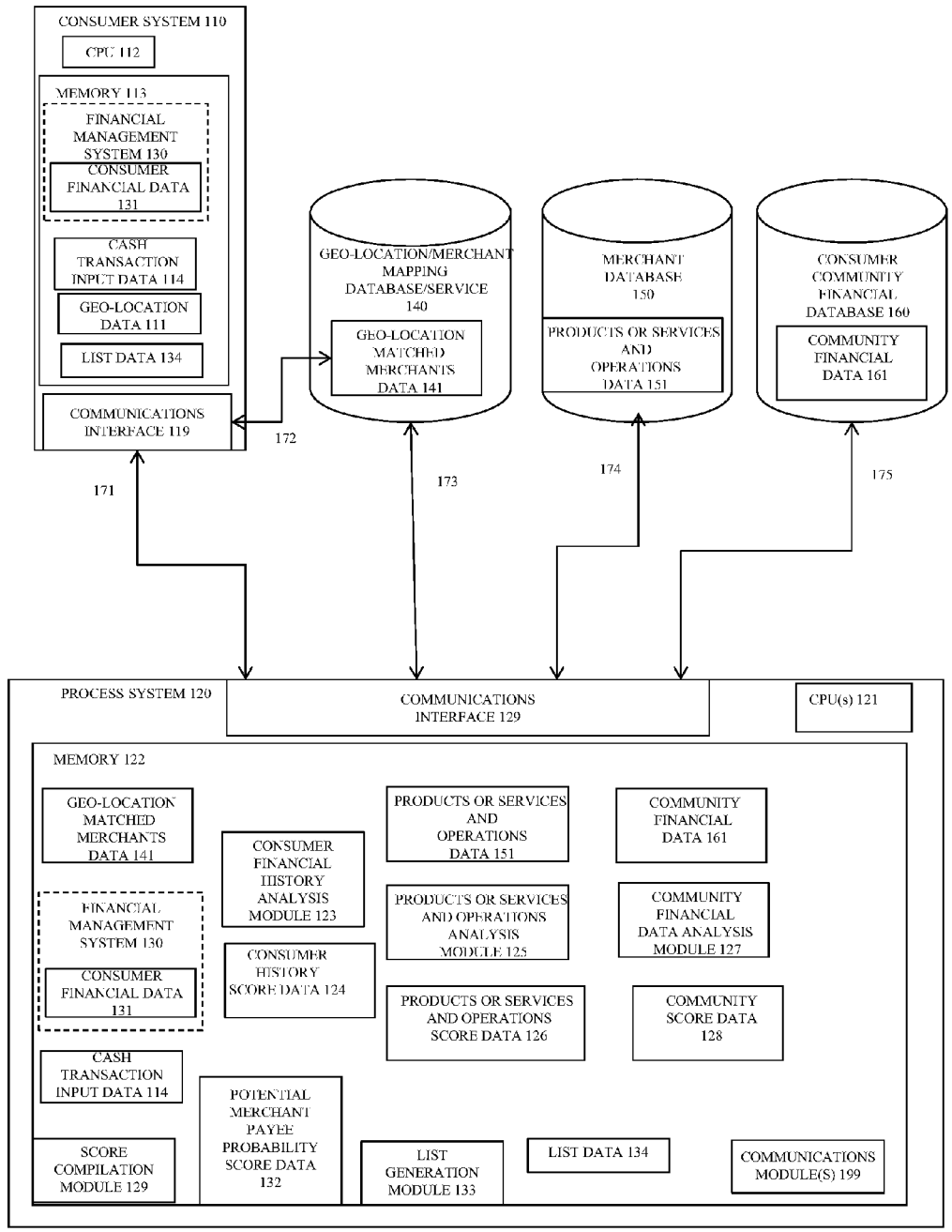
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for identifying a merchant payee associated with a cash transaction includes a process for identifying a merchant payee associated with a cash transaction implemented by one or more processors associated with one more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, the process for identifying a merchant payee associated with a cash transaction includes obtaining cash transaction entry data indicating a consumer has conducted a cash transaction with a merchant payee.

In one embodiment, the cash transaction entry data is received from a consumer who, in various embodiments, is any individual and/or entity as discussed herein, and/or as defined in the art at the time of filing, and/or as defined after the time of filing.

In various embodiments, the merchants are any providers of products or services, i.e., merchants such as, but not limited to, traditional, e.g., brick and mortar, providers of products or services and/or any other providers of products or services as discussed herein, and/or as defined in the art at the time of filing, and/or as defined after the time of filing.

In one embodiment, the cash transaction entry data is received from the consumer via a mobile computing system associated with the consumer. In one embodiment, the cash transaction entry data is received from the consumer via any computing system associated with the consumer, as discussed herein, and/or as known/available in the art at the time of filing, and/or as developed/made available after the time of filing.

In one embodiment, the cash transaction entry data is received from the consumer through a financial management system that is a parent application for, or is associated with, the process for identifying a merchant payee associated with a cash transaction.

Herein, a financial management system can be, but is not limited to, any data management system implemented on a computing system and/or accessed through a network that gathers general financial data, and/or financial transactional data, from one or more sources.

Herein, the term "financial management system" can denote, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business data management systems, packages, programs, modules, or applications, whether known at the time of filling, or as developed later.

Current financial management systems are typically software applications which, along with a parent computing system or device, help individuals/consumers/businesses manage their finances by providing a centralized interface with banks, credit card companies, asset account providers, mortgage companies, retirement account providers, and other various financial and asset management institutions and/or accounts, for identifying, processing, storing, and categorizing consumer financial transactions and financial data.

While currently available financial management systems work effectively with credit card, ATM card, and various other types of financial transactions involving "plastic" or other electronic data-based systems, not all financial transactions involve card or other electronic data-based systems. For instance, any cash-based transaction, by definition, does not involve card or other electronic data-based systems.

Currently, some financial management systems provide the ability to manually enter cash transactions/expenses into the financial management system. However, the capability to add cash transactions/expenses using a mobile application is currently overly burdensome to the user, due to several difficulties presented by mobile applications and mobile systems.

For instance, while a "qwerty" keyboard can be made to fit in a space less than 2" wide on a smart phone, that fact doesn't make it easy or efficient to use. Consequently, using mobile applications and mobile systems it is currently difficult to record/enter a cash transaction into the financial management system. In particular, it takes significant time to manually fill out transaction details, including manually entering a merchant payee name associated with a cash transaction.

As a result, it would be very beneficial to a consumer if a merchant payee could be determined based on the consumer's geo-location at the time of the cash transaction. However, it is often the case that more than one merchant, or potential merchant payee, is at, or near, the geo-location associated with a cash transaction. Consequently, currently, at best, a consumer is provided a non-prioritized list of all potential merchant payees near the geo-location associated with a cash transaction. The consumer must then try to scroll through the non-prioritized list of all potential merchant payees near the geo-location and, hopefully, find and select the desired potential merchant payee. This can represent a significant difficulty for the consumer since locations like shopping malls and buildings can include a significant number of potential merchant payees near the geo-location.

In one embodiment, the cash transaction entry data received from the consumer includes, but is not limited to, any of the following, the amount of the cash transaction, the date of the cash transaction, and the time of cash transaction.

In one embodiment, geo-location data associated with the cash transaction data is obtained. In one embodiment, the geo-location data associated with the cash transaction data is obtained from a mobile computing system associated with the consumer via a Global Positioning Satellite (GPS) feature or system, or other location tracking capability, implemented by, or on, or through, the mobile computing system associated with the consumer. In one embodiment, the geo-location data associated with the cash transaction data is obtained from any computing system, and from any source of geo-location data, associated with the consumer, as discussed herein, and/or as known/available in the art at the time of filing, and/or as developed/made available after the time of filing.

In one embodiment, using the geo-location data associated with the cash transaction any merchants located near the cash transaction geo-location are identified as potential merchant payees in the cash transaction. In one embodiment, the potential merchant payees, i.e., the geo-location matched merchants, are any merchants located within a defined radius of the cash transaction geo-location.

In various embodiments, the potential merchant payees, i.e., the geo-location matched merchants, are identified using a geo-location/merchant mapping service and/or a geo-location/merchant mapping database.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, the geo-location/merchant mapping service and/or a geo-location/merchant mapping database are accessed from, and/or implemented in part on, a mobile computing system associated with the consumer. In one embodiment, the geo-location/merchant mapping service and/or a geo-location/merchant mapping database are accessed from, and/or implemented in part on, any computing system associated with the consumer, as discussed herein, and/or as known/available in the art at the time of filing, and/or as developed/made available after the time of filing.

In one embodiment, if more than one potential merchant payee, i.e., geo-location matched merchant, is identified, one or more potential merchant payee analysis processes are implemented to try and determine the most likely potential merchant payee, e.g., the potential merchant payee with the highest probability score indicating the merchant is the most likely payee of the cash transaction.

In one embodiment, one potential merchant payee analysis process is a consumer history score generation process used to analyze the potential merchant payees, i.e., the geo-location matched merchants, using historical financial transaction data associated with the consumer to identify any previous transactions involving the consumer and the potential merchant payees.

In one embodiment, the historical financial transaction data associated with the consumer includes, but is not limited to, any of the following data; data indicating payees associated with the consumer's historical financial transactions; data indicating payees associated with the consumer's historical cash-based financial transactions; data indicating amounts associated with the consumer's historical financial transactions; data indicating amounts associated with the consumer's historical cash-based financial transactions; data indicating dates and/or times associated with the consumer's historical financial transactions; data indicating dates and/or times associated with the consumer's historical cash-based financial transactions; and/or any other historical financial transaction data associated with the consumer available and desired, as discussed herein, and/or as known in the art at the time of filing, and/or as developed/made available after the time of filing.

In one embodiment, the historical financial transaction data associated with the consumer is obtained from a financial management system associated with the consumer, such as any financial management system discussed herein, and/or as known in the art at the time of filing, and/or as developed/made available after the time of filing.

In one embodiment, the historical financial transaction data associated with the consumer is analyzed to determine if the consumer has previously conducted financial transactions with any of the potential merchant payees, i.e., the geo-location matched merchants, and/or if the consumer has previously conducted cash-based financial transactions with any of the potential merchant payees.

In one embodiment, if the consumer has previously conducted financial transactions with any of the potential merchant payees, the amount, time and date of the previously conducted financial transactions is obtained, if available.

A consumer history score is then assigned to each of the potential merchant payees based on the historical financial transaction data analysis. In one embodiment, the consumer history score reflects a determined probability that a given potential merchant payee is the payee of the current cash transaction based on the number, and type, of previously conducted financial transactions with any of the potential merchant payees.

For instance, in one embodiment, if the consumer has previously conducted financial transactions with any of the potential merchant payees, those potential merchant payees are assigned a higher consumer history score. In addition, in one embodiment, if the consumer has previously conducted cash-based financial transactions with any of the potential merchant payees, those potential merchant payees are assigned an even higher consumer history score.

Similarly, in one embodiment, if the consumer has previously conducted financial transactions having a similar transaction amount to the current cash transaction amount with any of the potential merchant payees, those potential merchant payees are assigned a higher consumer history score. In addition, if the consumer has previously conducted cash-based financial transactions having a similar transaction amount to the current cash transaction amount with any of the potential merchant payees, those potential merchant payees are assigned an even higher consumer history score.

Similarly, in one embodiment, if the consumer has previously conducted financial transactions at a similar time, or on the same day of the week or month, as the current cash transaction with any of the potential merchant payees, those potential merchant payees are assigned a higher consumer history score. In addition, in one embodiment, if the consumer has previously conducted cash-based financial transactions at a similar time, or on the same day of the week of month, as the current cash transaction with any of the potential merchant payees, those potential merchant payees are assigned an even higher consumer history score.

In one embodiment, data representing the consumer history score assigned to each of the potential merchant payees by the consumer history score generation process is then recorded/saved using any method, means, mechanism, process, or procedure for saving data as discussed herein, and/or as known in the art at the time of filing, and/or as developed/made available after the time of filing.

In one embodiment, another potential merchant payee analysis process is a products or services and operations score generation process used to analyze the potential merchant payees, i.e., the geo-location matched merchants, using products or services and operations data associated with the potential merchant payees, and the cash transaction entry data, to determine if the potential merchant payees are likely to accept cash transactions and/or if the cash transaction took place during the hours of operation of the potential merchant payees.

In one embodiment, the products or services and operations data associated with the potential merchant payees includes, but is not limited to, one or more of, data indicating the products or services offered by the potential merchant payees; data indicating the prices of the products or services offered by the potential merchant payees; data indicating the payment polices of the potential merchant payees, such as data indicating if the potential merchant payees accept cash, or provide products or services typically paid for using cash; data indicating the hours of operation of the potential merchant payees; data indicating days the potential merchant payees are closed, and/or holidays observed by the potential merchant payees; and/or any other products or services and operations data associated with the potential merchant payees available and desired, as discussed herein, and/or as known in the art at the time of filing, and/or as developed/made available after the time of filing.

In one embodiment, the products or services and operations data is obtained from one or more merchant databases, websites, networks, or similar locations, as discussed herein, and/or as known in the art at the time of filing, and/or as developed/made available after the time of filing.

As noted above, in one embodiment, the cash transaction entry data includes, but is not limited to, any one or more of the time and/or date of the cash transaction; and/or the amount of the cash transaction.

A products or services and operations score is then assigned to each of the potential merchant payees based on the products or services and operations analysis. In one embodiment, the products or services and operations score reflects a determined probability that a given potential merchant payee is the payee of the current cash transaction based on the information contained in the products or services and operations data.

For instance, in one embodiment, if the products or services and operations data indicates the products or services associated with any of the potential merchant payees are typically not paid for with cash, such as car sales, legal services, accounting services, etc., the potential merchant payees concerned are assigned a lower consumer products or services score Likewise, in one embodiment, if the products or services and operations data indicates the products or services associated with any of the potential merchant payees are typically paid for with cash, such as food sales, cleaning services, etc., the potential merchant payees concerned are assigned a higher consumer products or services score.

Similarly, in one embodiment, if the products or services and operations data indicates the potential merchant payees were closed at the time indicated by the cash transaction entry data, the potential merchant payees concerned are assigned a lower consumer products or services score, or, in some embodiments, are removed from consideration.

In one embodiment, data representing the products or services score assigned to each of the potential merchant payees by products or services and operations score generation process is then recorded/saved using any method, means, mechanism, process, or procedure for saving data as discussed herein, and/or as known in the art at the time of filing, and/or as developed/made available after the time of filing.

In one embodiment, another potential merchant payee analysis process is a community score generation process used to analyze the potential merchant payees, i.e., the geo-location matched merchants, using historical community financial transaction data associated with a community of consumers, including consumers other than the consumer, to identify any previous cash-based transactions involving any of the members of the community of consumers and the potential merchant payees.

In one embodiment, historical community financial transaction data includes, but is not limited to, any of the following data; data indicating payees associated with the community of consumers' historical financial transactions; data indicating payees associated with the community of consumers' historical cash-based financial transactions; data indicating amounts associated with the community of consumers' historical financial transactions; data indicating amounts associated with the community of consumers' historical cash-based financial transactions; data indicating dates and/or times associated with the community of consumers' historical financial transactions; data indicating dates and/or times associated with the community of consumers' historical cash-based financial transactions; and/or any other historical financial transaction data associated with the community of consumers available and desired, as discussed herein, and/or as known in the art at the time of filing, and/or as developed/made available after the time of filing.

In one embodiment, the historical financial transaction data associated with the community of consumers is obtained from one or more financial management systems associated with the community of consumers, such as any financial management system, as discussed herein, and/or as known in the art at the time of filing, and/or as developed/made available after the time of filing.

In one embodiment, the historical financial transaction data associated with the community of consumers is obtained from one or more consumer community financial data databases. In some embodiments, the one or more consumer community financial data databases are provided the historical financial transaction data associated with the community of consumers, and/or maintained, and/or associated with, one or more financial management systems associated with the community of consumers, such as any financial management system, as discussed herein, and/or as known in the art at the time of filing, and/or as developed/made available after the time of filing.

In one embodiment, the historical financial transaction data associated with community of consumers is analyzed to determine if any of the members of the community of consumers previously conducted cash-based financial transactions with any of the potential merchant payees, i.e., the geo-location matched merchants.

In one embodiment, if any member of the community of consumers previously conducted cash-based financial transactions with any of the potential merchant payees, the amount, time and date of the previously conducted financial transactions is obtained, if available.

A community score is then assigned to each of the potential merchant payees based on the community of consumers' historical financial transaction data analysis. In one embodiment, the community score reflects a determined probability that a given potential merchant payee is the payee of the current cash transaction based on the number, and type, of previously conducted cash-based financial transactions with any of the potential merchant payees.

For instance, in one embodiment, if a member of the community of consumers has previously conducted cash-based financial transactions with any of the potential merchant payees, those potential merchant payees are assigned a higher community score.

In one embodiment, data representing the community score assigned to each of the potential merchant payees by the community score generation process is then recorded/saved using any method, means, mechanism, process, or procedure for saving data as discussed herein, and/or as known in the art at the time of filing, and/or as developed/made available after the time of filing.

In one embodiment, at least part of the consumer history score, products or services and operations score, and/or the community score assigned to each of potential merchant payees, are compiled/added and transformed into a potential merchant payee probability score for each of the potential merchant payees.

In one embodiment, the potential merchant payee probability score for each of the potential merchant payees is then used to generate a prioritized potential merchant payee list for the cash transaction that includes at least one of the potential merchant payees.

In one embodiment, the prioritized potential merchant payee list for the cash transaction includes only the potential merchant payee with the highest potential merchant payee probability score.

In one embodiment, the prioritized potential merchant payee list for the cash transaction includes only a designated number of the potential merchant payees with the highest potential merchant payee probability scores; in one embodiment arranged in highest score order.

In one embodiment, the prioritized potential merchant payee list for the cash transaction includes only the potential merchant payees with a threshold potential merchant payee probability score or greater; in one embodiment arranged in highest score order.

In one embodiment, the prioritized potential merchant payee list for the cash transaction includes all the potential merchant payees arranged, in one embodiment, in highest score order.

In various embodiments, the prioritized potential merchant payee list is arranged in any way, and in any order desired.

In one embodiment, at least part of the prioritized potential merchant payee list for the cash transaction is then provided to the consumer. In one embodiment, at least part of the prioritized potential merchant payee list for the cash transaction is provided to the consumer through a mobile computing system associated with the consumer. In one embodiment, at least part of the prioritized potential merchant payee list for the cash transaction is provided to the consumer through any computing system associated with the consumer, as discussed herein, and/or as known/available in the art at the time of filing, and/or as developed/made available after the time of filing.

In one embodiment, at least part of the prioritized potential merchant payee list for the cash transaction is provided to the consumer, and/or a computing system associated with the consumer, through one or more network locations; e-mail; text message; POTS; or any other communications channel, method, means, mechanism, process, or procedure for providing/transferring data discussed herein, and/or as known/available in the art at the time of filing, and/or as developed/made available after the time of filing.

Using the system and method for identifying a merchant payee associated with a cash transaction discussed herein, a consumer is provided a way to more accurately determine, and enter/select, a likely merchant payee associated with a cash transaction based on the consumer's geo-location at the time of the cash transaction; even when there are multiple potential merchant payees near the geo-location associated with the cash transaction. Consequently, using the system and method for identifying a merchant payee associated with a cash transaction discussed herein, a consumer no longer needs to scroll through a long, un-prioritized, list of all potential merchant payees near the geo-location to try to identity and select the correct potential merchant payee.

Thus, the system and method for identifying a merchant payee associated with a cash transaction discussed herein, provides the consumer with a significant advantage, particularly in high merchant density locations like urban locations, shopping malls, and buildings, that can include a significant number of potential merchant payees near the geo-location associated with the cash transaction, and when using mobile computing systems, such as smart phones, that are not particularly well suited to scrolling through lists and selecting data from a large set of possible choices.

Hardware System Architecture

FIG. 1 is a block diagram of an exemplary hardware architecture for implementing one embodiment of a process for identifying a merchant payee associated with a cash transaction, such as exemplary process 300 (FIG. 3) discussed herein.

FIG. 1 includes consumer system 110, e.g., a computing system associated with a consumer payor involved in a cash transaction to a merchant payee; process system 120, e.g., a computing system associated with a provider of a process for identifying a merchant payee associated with a cash transaction; a geo-location/merchant mapping database/service 140, e.g. a database or mapping service providing geo-location matched merchants data representing merchants mapped to a given geo-location; a merchant database 150, e.g., a merchant website, network location, or any merchant data source providing products or services and operations data associated with one or more merchants; consumer community financial database 160, e.g., a database or data source providing community financial data, including financial transaction data associated with a community of consumers; and communications channels 171, 172, 173, 174, and 175.

As seen in FIG. 1, consumer system 110 includes processor/Central Processing Unit (CPU) 112, memory 113, and communication interface 119. In various embodiments, consumer system 110 can be any computing system discussed herein, and/or as known in the art at the time of filing, and/or as developed after the time of filing.

As seen in FIG. 1, memory 113 includes cash transaction input data 114. As discussed below, in one embodiment, cash transaction input data 114 is data indicating a consumer has conducted a cash transaction with a merchant payee.

As discussed below, in one embodiment, cash transaction input data 114 is generated and/or transferred through a financial management system, such as financial management system 130, that is a parent application for, or is associated with, a process for identifying a merchant payee associated with a cash transaction.

As discussed below, in one embodiment, cash transaction input data 114 includes, but is not limited to, any of the following, the amount of the cash transaction, the date of the cash transaction, and the time of cash transaction.

As seen in FIG. 1, memory 113 includes geo-location data 111. As discussed below, geo-location data 111 includes geo-location data associated with the cash transaction data 114. As discussed below, geo-location data 111 is obtained at, or near, the time of the cash transaction, and/or at the time the cash transaction entry data 114 indicating a consumer has conducted a cash transaction with a merchant payee is obtained. Consequently, in various embodiments, geo-location data 111 indicates the approximate location of the consumer at the time of the cash transaction of cash transaction entry data 114.

As seen in FIG. 1, memory 113 includes all, or part, of financial management system 130. In various embodiments, financial management system 130 is any financial management system discussed herein, and/or as known in the art at the time of filing, and/or as developed after the time of filing. In one embodiment, financial management system 130 includes consumer financial data 131.

In one embodiment, consumer financial data 131 includes historical financial transaction data associated with the consumer such as, but not limited to, any of the following data; data indicating payees associated with the consumer's historical financial transactions; data indicating payees associated with the consumer's historical cash-based financial transactions; data indicating amounts associated with the consumer's historical financial transactions; data indicating amounts associated with the consumer's historical cash-based financial transactions; data indicating dates and/or times associated with the consumer's historical financial transactions; data indicating dates and/or times associated with the consumer's historical cash-based financial transactions; and/or any other historical financial transaction data associated with the consumer available and desired, as discussed herein, and/or as known in the art at the time of filing, and/or as developed/made available after the time of filing.

As seen in FIG. 1, memory 113 includes all, or part, of list data 134 received from process system 120, as discussed below. In one embodiment, list data 134 includes data representing a prioritized potential merchant payee list received from process system 120, as discussed below.

In various embodiments, consumer system 110 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

While a single consumer system, consumer system 110, is shown in FIG. 1, those of skill in the art will readily recognize that consumer system 110 is representative of any number of consumer systems. Consequently, in various embodiments, there can be more than the single consumer system 110 shown in FIG. 1.

Also seen in FIG. 1 is geo-location/merchant mapping database/service 140, e.g. a database or mapping service providing geo-location matched merchants data 141 representing merchants/merchant locations mapped to geo-location data 111.

As discussed below, geo-location matched merchants data 141 is generated by the provider of geo-location/merchant mapping database/service 140 using geo-location data 111 from consumer system 110. Any merchants located near the cash transaction geo-location indicated by geo-location data 111 are then labeled/considered as potential merchant payees in the cash transaction of cash transaction entry data 114. In one embodiment, the potential merchant payees, i.e., the geo-location matched merchants, of geo-location matched merchants data 141 are any merchants located within a defined radius of the cash transaction geo-location indicated by geo-location data 111.

Also seen in FIG. 1 is merchant database 150, e.g., a merchant website, network location, or any merchant data source providing products or services and operations data 151 associated with one or more merchants.

As discussed below, in one embodiment, products or services and operations data 151 includes, but is not limited to, one or more of, data indicating the products or services offered by the potential merchant payees; data indicating the prices of the products or services offered by the potential merchant payees; data indicating the payment polices of the potential merchant payees, such as data indicating if the potential merchant payees accept cash, or provide products or services typically paid for using cash; data indicating the hours of operation of the potential merchant payees; data indicating days the potential merchant payees are closed, and/or holidays observed by the potential merchant payees; and/or any other products or services and operations data associated with the potential merchant payees available and desired, as discussed herein, and/or as known in the art at the time of filing, and/or as developed/made available after the time of filing.

Also seen in FIG. 1 is consumer community financial database 160, e.g., a database or data source providing community financial data 161 including historical financial transaction data associated with a community of consumers.

As discussed below, in one embodiment, community financial data 161 includes historical community financial transaction data such as, but not limited to, any of the following data; data indicating payees associated with the community of consumers' historical financial transactions; data indicating payees associated with the community of consumers' historical cash-based financial transactions; data indicating amounts associated with the community of consumers' historical financial transactions; data indicating amounts associated with the community of consumers' historical cash-based financial transactions; data indicating dates and/or times associated with the community of consumers' historical financial transactions; data indicating dates and/or times associated with the community of consumers' historical cash-based financial transactions; and/or any other historical financial transaction data associated with the community of consumers available and desired, and/or as discussed herein, and/or as known in the art at the time of filing, and/or as developed/made available after the time of filing.

In one embodiment, community financial data 161 is obtained from one or more financial management systems associated with the community of consumers, such as financial management system 130, and/or any financial management system as discussed herein, and/or as known in the art at the time of filing, and/or as developed/made available after the time of filing.

As also seen in FIG. 1, process system 120 typically includes one or more processor/Central Processing Units (CPUs) 121, a memory 122, and a communications interface 129.

Process system 120 can be any computing system as discussed herein, and/or as known in the art at the time of filing, and/or as developed thereafter, that includes components that can execute all, or part, of a process for identifying a merchant payee associated with a cash transaction in accordance with at least one of the embodiments as described herein.

In one embodiment, memory 122 includes all, or part, of geo-location matched merchants data 141 as received from geo-location/merchant mapping database/service 140 discussed above; cash transaction input data 114, as received from consumer system 110 discussed above; financial management system 130, including consumer financial data 131 discussed above; products or services and operations data 151, as received from merchant database 150 discussed above; and community financial data 161, as received from consumer community financial database 160 discussed above.

In one embodiment, memory 122 includes all, or part, of consumer financial history analysis module 123 which, as discussed below, transforms at least part of cash transaction input data 114, consumer financial data 131, and geo-location matched merchants data 141 into consumer history score data 124.

As discussed below, consumer history score data 124 reflects a determined probability that a given potential merchant payee of geo-location matched merchants data 141 is the payee of the current cash transaction of cash transaction input data 114 based on the number, and type, of previously conducted financial transactions with any of the potential merchant payees indicated in consumer financial data 131.

In one embodiment, memory 122 includes all, or part, of products or services and operations analysis module 125 which, as discussed below, transforms at least part of cash transaction input data 114, products or services and operations data 151, and geo-location matched merchants data 141 into products or services and operations score data 126.

As discussed below, products or services and operations score data 126 reflects a determined probability that a given potential merchant payee of geo-location matched merchants data 141 is the payee of the current cash transaction of cash transaction input data 114 based on an analysis of products or services and operations indicated in products or services and operations data 151.

In one embodiment, memory 122 includes all, or part, of community financial data analysis module 127 which, as discussed below, transforms at least part of community financial data 161 and geo-location matched merchants data 141 into community score data 128.

As discussed below, community score data 128 reflects a determined probability that a given potential merchant payee of geo-location matched merchants data 141 is the payee of the current cash transaction of cash transaction input data 114 based on the number, and type, of previously conducted cash-based financial transactions with any of the potential merchant payees by any of the members of the consumer community indicated in community financial data 161.

In one embodiment, memory 122 includes score compilation module 129 which, as discussed below, compiles and transforms at least part of consumer history score data 124, products or services and operations score data 126, and/or community score data 128 assigned to each of potential merchant payees into potential merchant payee probability score data 132 for each of the potential merchant payees.

In one embodiment, memory 122 includes list generation module 133 which, as discussed below, uses at least part of the potential merchant payee probability score data 132 for each of the potential merchant payees to generate list data 134. In one embodiment, list data 134 includes data representing a prioritized potential merchant payee list, as discussed below.

Process system 120 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

In one embodiment, any, or all, of communications channels 171, 172, 173, 174, and 175 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, consumer system 110, and/or process system 120, and/or geo-location/merchant mapping database/service 140, and/or merchant database 150, and/or consumer community financial database 160, are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, consumer system 110, and/or process system 120, and/or geo-location/merchant mapping database/service 140, and/or merchant database 150, and/or consumer community financial database 160, are not relevant.

In various embodiments, the elements shown in FIG. 1 are grouped into one or more processes, or sub-processes, used to implement all, or part of, a process for identifying a merchant payee associated with a cash transaction, such as exemplary process 300 (FIG. 3) discussed herein.

Figure 2A:
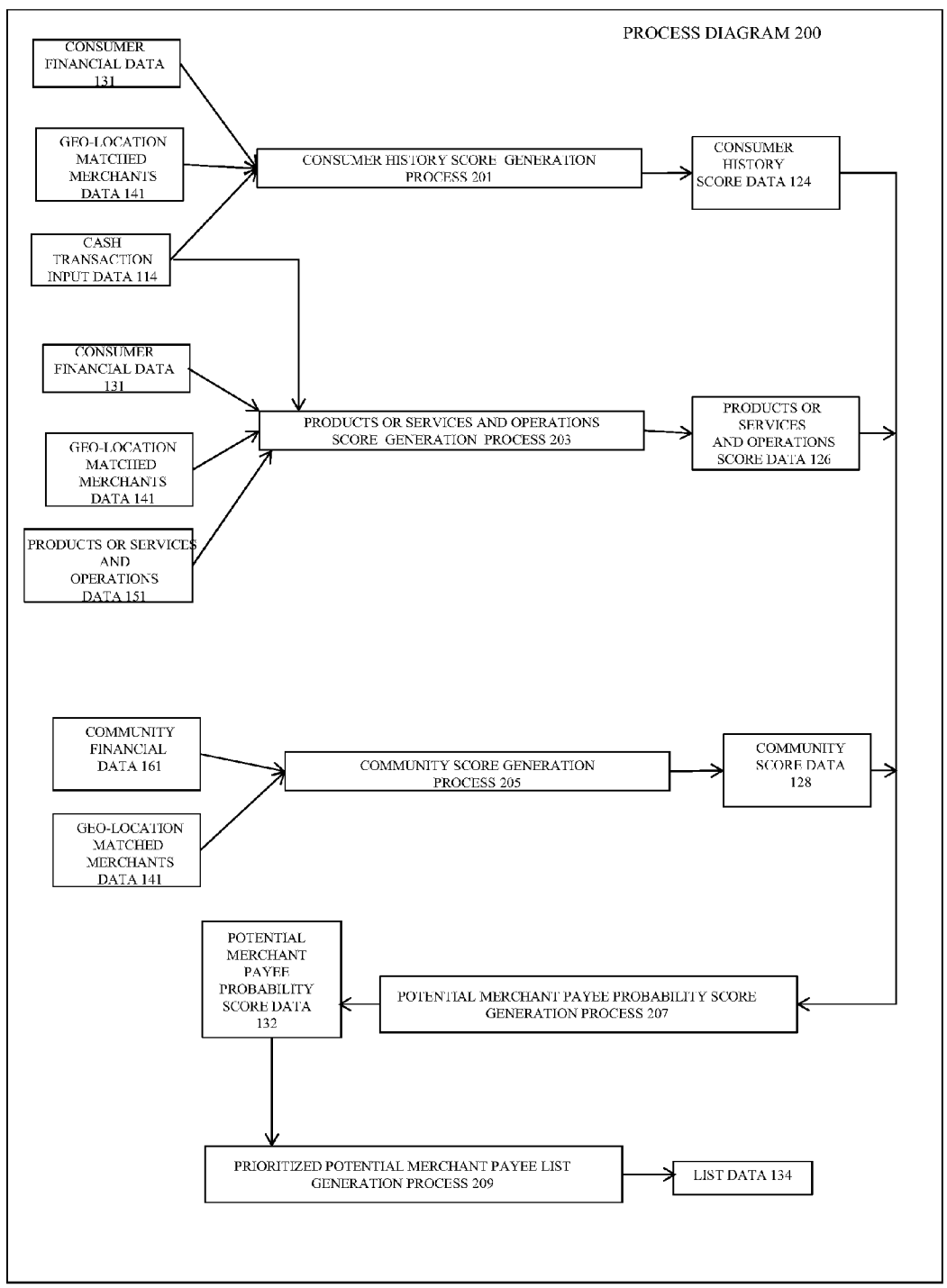
FIG. 2A is a process diagram of part of a process for identifying a merchant payee associated with a cash transaction in accordance with one embodiment.

FIG. 2A is a process diagram showing one illustrative example of the interaction of various illustrative processes, or sub-processes, 201, 203, 205, 207, and 209, used to implement all, or part of, a process for identifying a merchant payee associated with a cash transaction, such as exemplary process 300 (FIG. 3) discussed herein.

FIGS. 2B, 2C, 2D, 2E, and 2F show illustrative examples of processes 201, 203, 205, 207, and 209 in accordance with one embodiment.

Figure 2B:
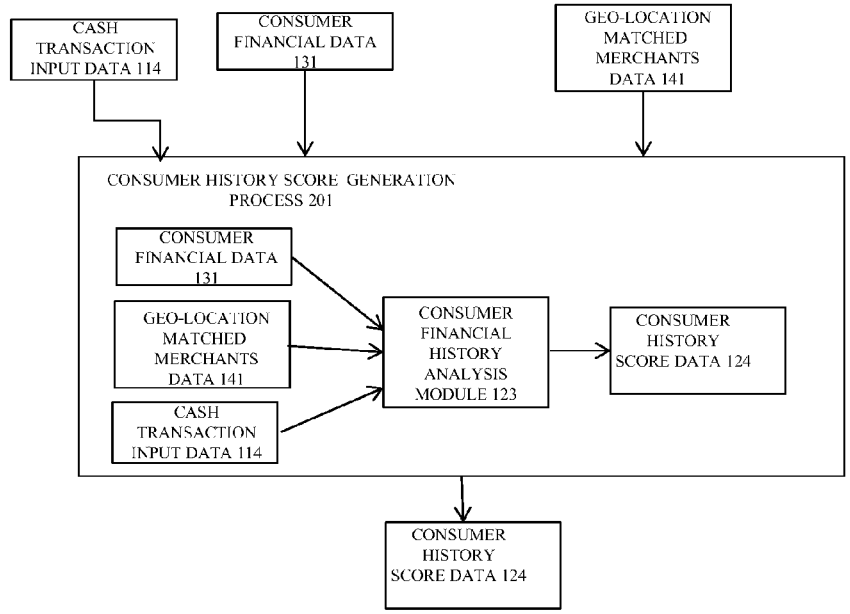
FIG. 2B shows a consumer history score generation process in accordance with one embodiment.

Referring to FIG. 1, FIG. 2A, FIG. 2B, FIG. 2C, FIG. 2D, FIG. 2E, and FIG. 2F together, cash transaction input data 114, consumer financial data 131, and geo-location matched merchants data 141 are provided to consumer history score generation process 201 which generates consumer history score data 124. FIG. 2B shows consumer history score generation process 201 in more detail.

As seen in FIG. 2B cash transaction input data 114, consumer financial data 131, and geo-location matched merchants data 141 are used as input data to consumer financial history analysis module 123 which transforms at least part of cash transaction input data 114, consumer financial data 131, and geo-location matched merchants data 141 into consumer history score data 124.

As discussed below consumer history score data 124 reflects a determined probability that a given potential merchant payee of geo-location matched merchants data 141 is the payee of the current cash transaction of cash transaction input data 114 based on the number, and type, of previously conducted financial transactions with any of the potential merchant payees indicated in consumer financial data 131.

For instance, in one embodiment, if the consumer has previously conducted financial transactions with any of the potential merchant payees, as indicated in consumer financial data 131, those potential merchant payees are assigned a higher consumer history score by consumer financial history analysis module 123. In addition, in one embodiment, if the consumer has previously conducted cash-based financial transactions with any of the potential merchant payees, as indicated in consumer financial data 131, those potential merchant payees are assigned an even higher consumer history score by consumer financial history analysis module 123.

Similarly, in one embodiment, if the consumer has previously conducted financial transactions having a similar transaction amount to the current cash transaction amount with any of the potential merchant payees, as indicated in consumer financial data 131, those potential merchant payees are assigned a higher consumer history score by consumer financial history analysis module 123.

In addition, if the consumer has previously conducted cash-based financial transactions having a similar transaction amount to the current cash transaction amount with any of the potential merchant payees, as indicated in consumer financial data 131, those potential merchant payees are assigned an even higher consumer history score by consumer financial history analysis module 123.

Similarly, in one embodiment, if the consumer has previously conducted financial transactions at a similar time, or on the same day of the week or month, as the current cash transaction with any of the potential merchant payees, as indicated in consumer financial data 131, those potential merchant payees are assigned a higher consumer history score by consumer financial history analysis module 123.

In addition, in one embodiment, if the consumer has previously conducted cash-based financial transactions at a similar time, or on the same day of the week of month, as the current cash transaction with any of the potential merchant payees, as indicated in consumer financial data 131, those potential merchant payees are assigned an even higher consumer history score by consumer financial history analysis module 123.

Figure 2C:
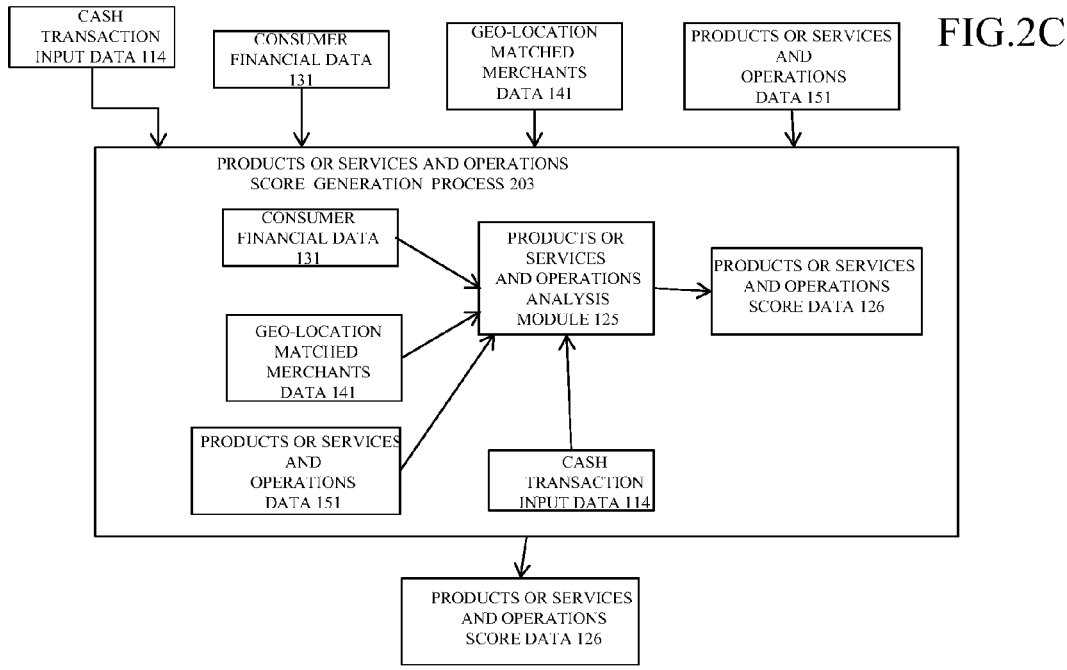
FIG. 2C shows a products or services and operations score generation process in accordance with one embodiment.

Referring back to FIG. 1, FIG. 2A, FIG. 2B, FIG. 2C, FIG. 2D, FIG. 2E, and FIG. 2F together, cash transaction input data 114, products or services and operations data 151, geo-location matched merchants data 141, and consumer financial data 131 are provided to products or services and operations score generation process 203 which generates products or services and operations score data 126. FIG. 2C shows products or services and operations score generation process 203 in more detail.

As seen in FIG. 2C, cash transaction input data 114, consumer financial data 131, products or services and operations data 151, and geo-location matched merchants data 141 are used as input data to products or services and operations analysis module 125 which transforms at least part of cash transaction input data 114, products or services and operations data 151, consumer financial data 131, and geo-location matched merchants data 141 into products or services and operations score data 126.

As discussed below, products or services and operations score data 126 reflects a determined probability that a given potential merchant payee of geo-location matched merchants data 141 is the payee of the current cash transaction of cash transaction input data 114 based on an analysis of products or services and operations indicated in products or services and operations data 151.

For instance, in one embodiment, if products or services and operations data 151 indicates the products or services associated with any of the potential merchant payees of geo-location matched merchants data 141 are typically not paid for with cash, such as car sales, legal services, accounting services, etc., the potential merchant payees concerned are assigned a lower products or services and operations score by products or services and operations analysis module 125.

Likewise, in one embodiment, if products or services and operations data 151 indicates the products or services associated with any of the potential merchant payees of geo-location matched merchants data 141 are typically paid for with cash, such as food sales, cleaning services, etc., the potential merchant payees concerned are assigned a higher products or services and operations score by products or services and operations analysis module 125.

Similarly, in one embodiment, if products or services and operations data 151 indicates any of the potential merchant payees of geo-location matched merchants data 141 were closed at the time indicated by the cash transaction entry data 114, the potential merchant payees concerned are assigned a lower products or services and operations score by products or services and operations analysis module 125, or, in some embodiments, are removed from consideration by products or services and operations analysis module 125.

Figure 2D:
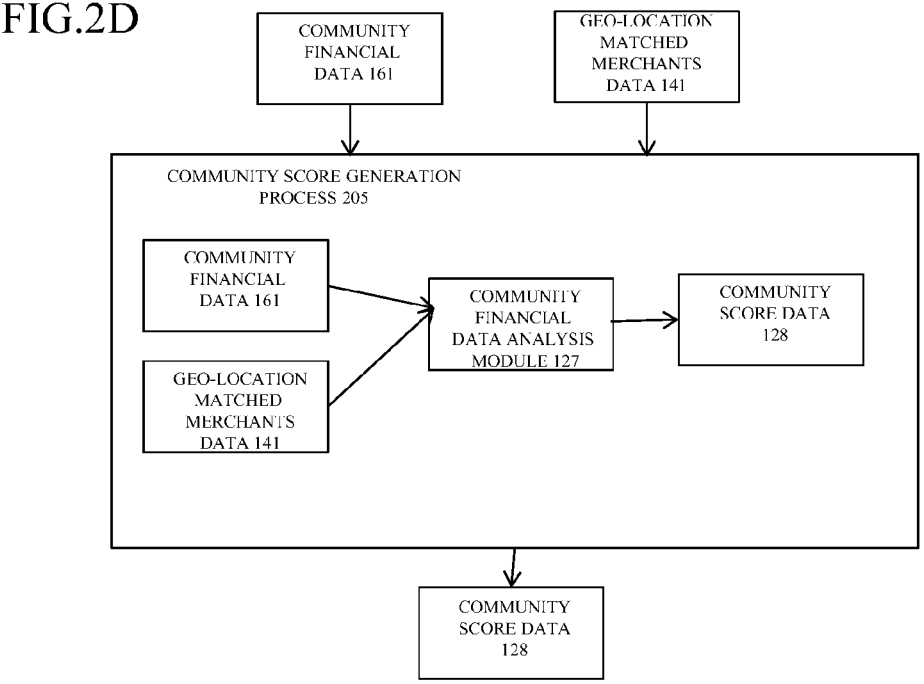
FIG. 2D shows a community score generation process in accordance with one embodiment.

Referring back to FIG. 1, FIG. 2A, FIG. 2B, FIG. 2C, FIG. 2D, FIG. 2E, and FIG. 2F together, community financial data 161 and geo-location matched merchants data 141 are provided to community score generation process 205 which generates community score data 128. FIG. 2D shows community score generation process 205 in more detail.

As seen in FIG. 2D, community financial data 161 and geo-location matched merchants data 141 are used as input data to community financial data analysis module 127 which transforms at least part of community financial data 161 and geo-location matched merchants data 141 into community score data 128.

As discussed below, community score data 128 reflects a determined probability that a given potential merchant payee of geo-location matched merchants data 141 is the payee of the current cash transaction of cash transaction input data 114 based on the number, and type, of previously conducted cash-based financial transactions with any of the potential merchant payees by any of the members of the consumer community indicated in community financial data 161.

For instance, in one embodiment, if a member of the community of consumers has previously conducted cash-based financial transactions with any of the potential merchant payees of geo-location matched merchants data 141, as indicated by community financial data 161, those potential merchant payees are assigned a higher community score by community financial data analysis module 127.

Figure 2E:
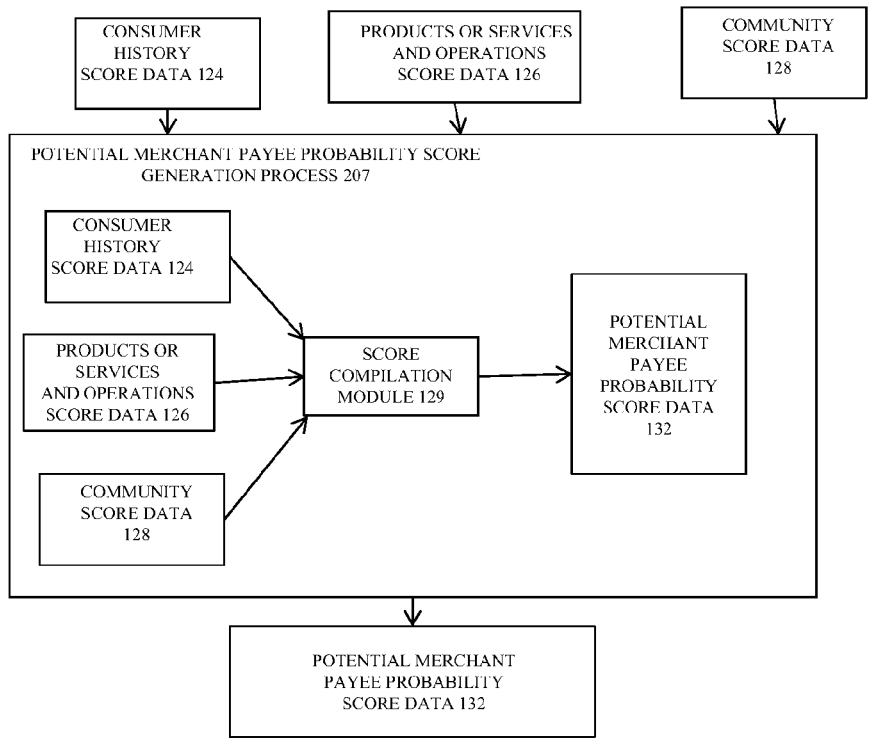
FIG. 2E shows a potential merchant payee probability score generation process in accordance with one embodiment.

Referring back to FIG. 1, FIG. 2A, FIG. 2B, FIG. 2C, FIG. 2D, FIG. 2E, and FIG. 2F together, consumer history score data 124, products or services and operations score data 126, and community score data 128 are provided to potential merchant payee probability score generation process 207 which generates potential merchant payee probability score data 132. FIG. 2E shows potential merchant payee probability score generation process 207 in more detail.

As seen in FIG. 2E, consumer history score data 124, products or services and operations score data 126, and community score data 128 are provided as input data to score compilation module 129 which adds/compiles and transforms at least part of consumer history score data 124, products or services and operations score data 126, and/or community score data 128 assigned to each of potential merchant payees into potential merchant payee probability score data 132 for each of the potential merchant payees.

Figure 2F:
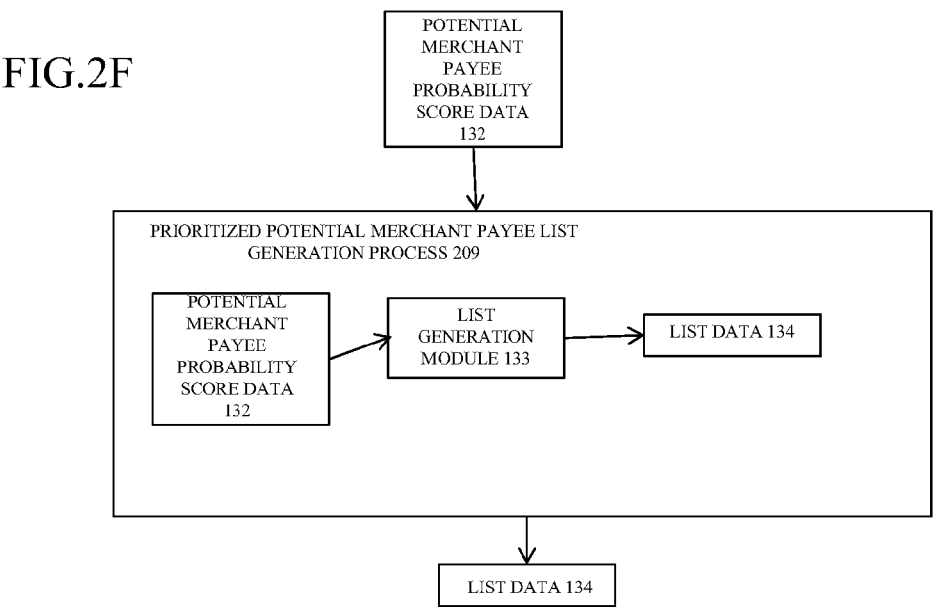
FIG. 2F shows a prioritized potential merchant payee list generation process in accordance with one embodiment.

Referring back to FIG. 1, FIG. 2A, FIG. 2B, FIG. 2C, FIG. 2D, FIG. 2E, and FIG. 2F together, potential merchant payee probability score data 132 is provided to prioritized potential merchant payee list generation process 209 which generates list data 134. FIG. 2F shows prioritized potential merchant payee list generation process 209 in more detail.

As seen in FIG. 2F, potential merchant payee probability score data 132 is used as input data to list generation module 133 which transforms at least part of potential merchant payee probability score data 132 into list data 134.

In one embodiment, list data 134 includes data representing a prioritized potential merchant payee list.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a system and method for identifying a merchant payee associated with a cash transaction includes obtaining cash transaction entry data indicating a consumer has conducted a cash transaction with a merchant payee. In one embodiment, cash transaction geo-location data associated with the cash transaction data is obtained and any merchants located near the cash transaction geo-location are identified as potential merchant payees in the cash transaction.

In one embodiment, if more than one merchant is identified as a potential merchant payee, data representing the potential merchant payees is analyzed using historical financial transaction data associated with the consumer to identify any previous transactions involving the consumer and the potential merchant payees. A consumer history score is then assigned to each of the potential merchant payees based on the historical financial transaction data analysis.

In one embodiment, if more than one merchant is identified as a potential merchant payee, products or services and operations data associated with the potential merchant payees is compared with the cash transaction data to determine if the potential merchant payees are likely to accept cash transactions and/or if the cash transaction took place during the hours of operation of the potential merchant payees. A products or services and operations score is then assigned to each of the potential merchant payees based on the products or services and operations data analysis.

In one embodiment, if more than one merchant is identified as a potential merchant payee, data representing the potential merchant payees is analyzed using historical financial transaction data associated with a community of consumers, including consumers other than the consumer, to identify any previous cash-based transactions involving any of the members of the community of consumers and the potential merchant payees. A community score is then assigned to each of the potential merchant payees based on the historical financial transaction data analysis.

In one embodiment, at least part of the consumer history score, products or services and operations score, and community score assigned to each of potential merchant payees are compiled and transformed into a potential merchant payee probability score for each of the potential merchant payees. In one embodiment, the potential merchant payee probability score for each of the potential merchant payees is then used to generate a prioritized potential merchant payee list for the cash transaction that includes at least one of the potential merchant payees. In one embodiment, at least part of the prioritized potential merchant payee list for the cash transaction is then provided to the consumer.

Figure 3:
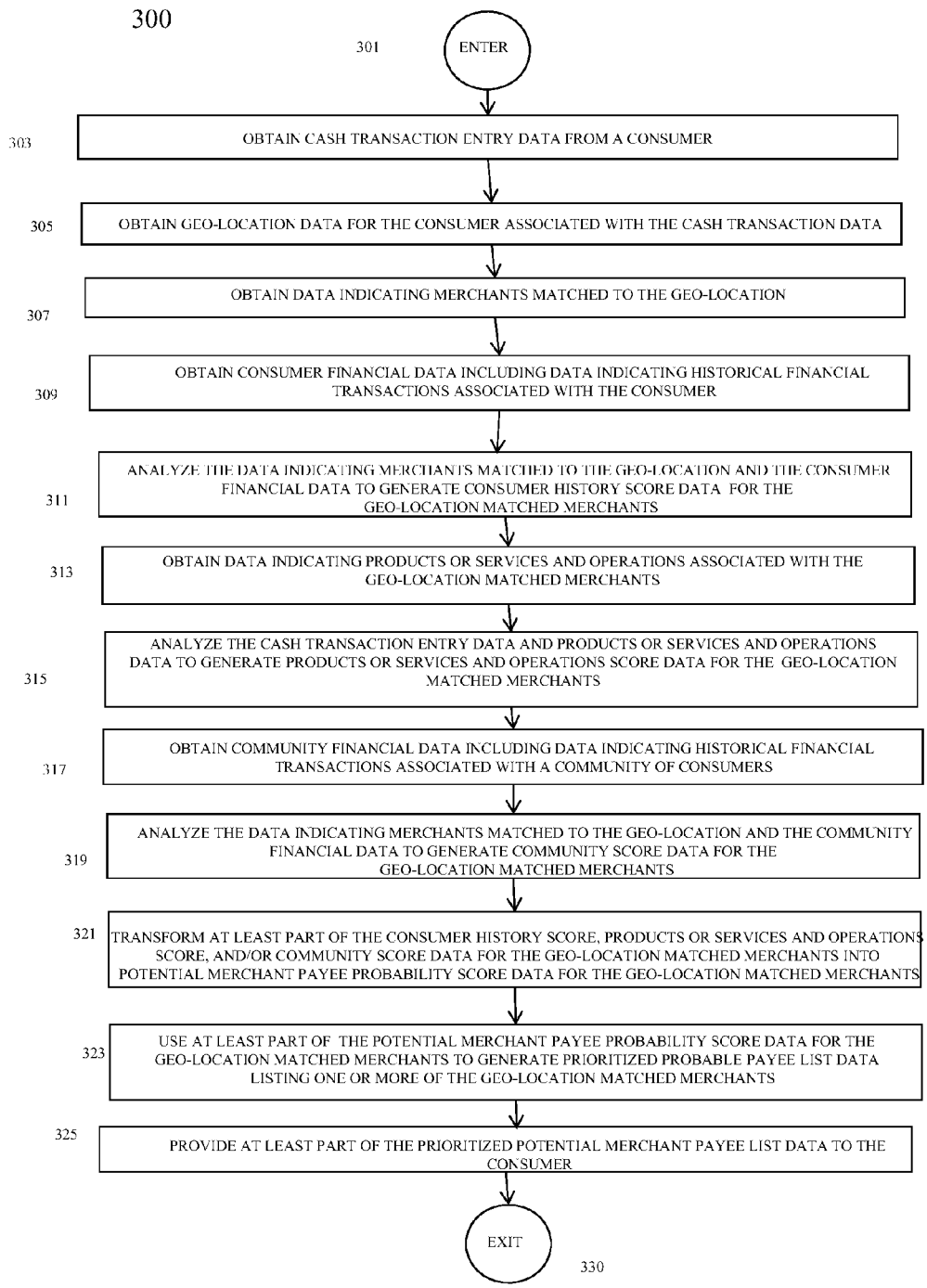
FIG. 3 is a flow chart depicting a process for identifying a merchant payee associated with a cash transaction in accordance with one embodiment.

FIG. 3 is a flow chart depicting a process 300 for identifying a merchant payee associated with a cash transaction in accordance with one embodiment. Process 300 for identifying a merchant payee associated with a cash transaction begins at ENTER OPERATION 301 of FIG. 3 and process flow proceeds to OBTAIN CASH TRANSACTION ENTRY DATA FROM A CONSUMER OPERATION 303.

In one embodiment, at OBTAIN CASH TRANSACTION ENTRY DATA FROM A CONSUMER OPERATION 303 cash transaction entry data indicating a consumer has conducted a cash transaction with an unidentified merchant payee is obtained.

In various embodiments, the consumer of OBTAIN CASH TRANSACTION ENTRY DATA FROM A CONSUMER OPERATION 303 is any individual and/or entity as discussed herein, and/or as defined in the art at the time of filing, and/or as defined in the art after the time of filing.

In one embodiment, the cash transaction entry data is received at OBTAIN CASH TRANSACTION ENTRY DATA FROM A CONSUMER OPERATION 303 from a consumer via a mobile computing system associated with the consumer.

In one embodiment, the cash transaction entry data is received at OBTAIN CASH TRANSACTION ENTRY DATA FROM A CONSUMER OPERATION 303 from the consumer via any computing system associated with the consumer, as discussed herein, and/or as known/available in the art at the time of filing, and/or as developed/made available after the time of filing.

In one embodiment, the cash transaction entry data is received at OBTAIN CASH TRANSACTION ENTRY DATA FROM A CONSUMER OPERATION 303 from the consumer through a financial management system that is a parent application for, and/or is associated with, process 300 for identifying a merchant payee associated with a cash transaction, such as any financial management system discussed herein, and/or as known in the art at the time of filing, and/or as developed/made available after the time of filing.

As noted above, the capability to add cash transactions/expenses to a financial management system using a mobile application is currently overly burdensome to the user, due to several difficulties presented by mobile applications and mobile systems, including the fact that, while a "qwerty" keyboard can be made to fit in a space less than 2" wide on a smart phone, that doesn't make it easy or efficient to use. Consequently, using mobile applications and mobile systems it is currently difficult to record/enter a cash transaction into the financial management system.

In particular, currently, it takes significant time to manually fill out transaction details, including manually entering a merchant payee name associated with a cash transaction. As a result, it would be very beneficial to a consumer if a merchant payee could be determined based on the consumer's geo-location at the time of the cash transaction. However, it is often the case that more than one merchant, or potential merchant payee, is at, or near, the geo-location associated with a cash transaction. Consequently, currently, at best, a consumer is provided a non-prioritized list of all potential merchant payees near the geo-location associated with a cash transaction. The consumer must then try to scroll through the non-prioritized list of all potential merchant payees near the geo-location and, hopefully, find and select the desired potential merchant payee. This can represent a significant difficulty for the consumer since locations like shopping malls and buildings can include a significant number of potential merchant payees near the geo-location.

In one embodiment, the cash transaction entry data received from the consumer at OBTAIN CASH TRANSACTION ENTRY DATA FROM A CONSUMER OPERATION 303 includes, but is not limited to, any of the following, the amount of the cash transaction, the date of the cash transaction, and the time of cash transaction.

In one embodiment, once the cash transaction entry data indicating a consumer has conducted a cash transaction with a merchant payee is obtained at OBTAIN CASH TRANSACTION ENTRY DATA FROM A CONSUMER OPERATION 303, process flow proceeds to OBTAIN GEO-LOCATION DATA FOR THE CONSUMER ASSOCIATED WITH THE CASH TRANSACTION DATA OPERATION 305.

In one embodiment, at OBTAIN GEO-LOCATION DATA FOR THE CONSUMER ASSOCIATED WITH THE CASH TRANSACTION DATA OPERATION 305, geo-location data associated with the cash transaction data is obtained.

In one embodiment, the geo-location data associated with the cash transaction data of OBTAIN GEO-LOCATION DATA FOR THE CONSUMER ASSOCIATED WITH THE CASH TRANSACTION DATA OPERATION 305 is obtained at, or near, the time of the cash transaction, and/or at the time the cash transaction entry data indicating a consumer has conducted a cash transaction with a merchant payee is obtained at OBTAIN CASH TRANSACTION ENTRY DATA FROM A CONSUMER OPERATION 303. Consequently, in various embodiments, the geo-location data associated with the cash transaction indicates the approximate location of the consumer at the time of the cash transaction.

In one embodiment, at OBTAIN GEO-LOCATION DATA FOR THE CONSUMER ASSOCIATED WITH THE CASH TRANSACTION DATA OPERATION 305 the geo-location data associated with the cash transaction data is obtained from a mobile computing system associated with the consumer via a Global Positioning Satellite (GPS) feature or system, or other location tracking capability, implemented by, or on, or through, a mobile computing system associated with the consumer.

In one embodiment, at OBTAIN GEO-LOCATION DATA FOR THE CONSUMER ASSOCIATED WITH THE CASH TRANSACTION DATA OPERATION 305 the geo-location data associated with the cash transaction data is obtained from any computing system, and/or from any source of geo-location data, associated with the consumer, as discussed herein, and/or as known/available in the art at the time of filing, and/or as developed/made available after the time of filing.

In one embodiment, once the geo-location data associated with the cash transaction data is obtained at OBTAIN GEO-LOCATION DATA FOR THE CONSUMER ASSOCIATED WITH THE CASH TRANSACTION DATA OPERATION 305, process flow proceeds to OBTAIN DATA INDICATING MERCHANTS MATCHED TO THE GEO-LOCATION OPERATION 307.

In one embodiment, at OBTAIN DATA INDICATING MERCHANTS MATCHED TO THE GEO-LOCATION OPERATION 307, using the geo-location data associated with the cash transaction of OBTAIN GEO-LOCATION DATA FOR THE CONSUMER ASSOCIATED WITH THE CASH TRANSACTION DATA OPERATION 305, any merchants located near the cash transaction geo-location are identified as potential merchant payees of the cash transaction.

In one embodiment, the potential merchant payees, i.e., the geo-location matched merchants, of OBTAIN DATA INDICATING MERCHANTS MATCHED TO THE GEO-LOCATION OPERATION 307 are any merchants located within a defined radius of the cash transaction geo-location.

In various embodiments, the potential merchant payees, i.e., the geo-location matched merchants, are identified at OBTAIN DATA INDICATING MERCHANTS MATCHED TO THE GEO-LOCATION OPERATION 307 using a geo-location/merchant mapping service and/or a geo-location/merchant mapping database.

In one embodiment, at OBTAIN DATA INDICATING MERCHANTS MATCHED TO THE GEO-LOCATION OPERATION 307 the geo-location/merchant mapping service and/or a geo-location/merchant mapping database are accessed from, and/or implemented in part on, a mobile computing system associated with the consumer.

In one embodiment, at OBTAIN DATA INDICATING MERCHANTS MATCHED TO THE GEO-LOCATION OPERATION 307 the geo-location/merchant mapping service and/or a geo-location/merchant mapping database are accessed from, and/or implemented in part on, any computing system associated with the consumer, as discussed herein, and/or as known/available in the art at the time of filing, and/or as developed/made available after the time of filing.

As discussed below, in one embodiment, if at OBTAIN DATA INDICATING MERCHANTS MATCHED TO THE GEO-LOCATION OPERATION 307 more than one potential merchant payee, i.e., geo-location matched merchant, is identified, one or more potential merchant payee analysis processes are implemented to try and determine the most likely potential merchant payee, e.g., the potential merchant payee with the highest probability score indicating the merchant is the most likely payee of the cash transaction.

In one embodiment, once using the geo-location data associated with the cash transaction of OBTAIN GEO-LOCATION DATA FOR THE CONSUMER ASSOCIATED WITH THE CASH TRANSACTION DATA OPERATION 305, any merchants located near the cash transaction geo-location are identified as potential merchant payees in the cash transaction at OBTAIN DATA INDICATING MERCHANTS MATCHED TO THE GEO-LOCATION OPERATION 307, process flow proceeds to OBTAIN CONSUMER FINANCIAL DATA INCLUDING DATA INDICATING HISTORICAL FINANCIAL TRANSACTIONS ASSOCIATED WITH THE CONSUMER OPERATION 309.

In one embodiment, at OBTAIN CONSUMER FINANCIAL DATA INCLUDING DATA INDICATING HISTORICAL FINANCIAL TRANSACTIONS ASSOCIATED WITH THE CONSUMER OPERATION 309, historical financial transaction data associated with the consumer is obtained.

In one embodiment, the historical financial transaction data associated with the consumer obtained at OBTAIN CONSUMER FINANCIAL DATA INCLUDING DATA INDICATING HISTORICAL FINANCIAL TRANSACTIONS ASSOCIATED WITH THE CONSUMER OPERATION 309 includes, but is not limited to, any of the following data; data indicating payees associated with the consumer's historical financial transactions; data indicating payees associated with the consumer's historical cash-based financial transactions; data indicating amounts associated with the consumer's historical financial transactions; data indicating amounts associated with the consumer's historical cash-based financial transactions; data indicating dates and/or times associated with the consumer's historical financial transactions; data indicating dates and/or times associated with the consumer's historical cash-based financial transactions; and/or any other historical financial transaction data associated with the consumer available and desired, as discussed herein, and/or as known in the art at the time of filing, and/or as developed/made available after the time of filing.

In one embodiment, the historical financial transaction data associated with the consumer is obtained at OBTAIN CONSUMER FINANCIAL DATA INCLUDING DATA INDICATING HISTORICAL FINANCIAL TRANSACTIONS ASSOCIATED WITH THE CONSUMER OPERATION 309 from a financial management system associated with the consumer, such as any financial management system discussed herein, and/or as known in the art at the time of filing, and/or as developed/made available after the time of filing.

In one embodiment, once historical financial transaction data associated with the consumer is obtained at OBTAIN CONSUMER FINANCIAL DATA INCLUDING DATA INDICATING HISTORICAL FINANCIAL TRANSACTIONS ASSOCIATED WITH THE CONSUMER OPERATION 309 process flow proceeds to ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311.

In one embodiment, at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 a consumer history score is determined and assigned to each of the potential merchant payees of OBTAIN DATA INDICATING MERCHANTS MATCHED TO THE GEO-LOCATION OPERATION 307 based on historical financial transaction data analysis.

In one embodiment, at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311, a consumer history score generation process is used to analyze the potential merchant payees, i.e., the geo-location matched merchants, using the historical financial transaction data associated with the consumer of OBTAIN CONSUMER FINANCIAL DATA INCLUDING DATA INDICATING HISTORICAL FINANCIAL TRANSACTIONS ASSOCIATED WITH THE CONSUMER OPERATION 309 to identify any previous transactions involving the consumer and the potential merchant payees.

In one embodiment, the historical financial transaction data associated with the consumer is analyzed at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 to determine if the consumer has previously conducted financial transactions with any of the potential merchant payees, i.e., the geo-location matched merchants of OBTAIN DATA INDICATING MERCHANTS MATCHED TO THE GEO-LOCATION OPERATION 307, and/or if the consumer has previously conducted cash-based financial transactions with any of the potential merchant payees.

In one embodiment, if the consumer has previously conducted financial transactions with any of the potential merchant payees, the amount, time and date of the previously conducted financial transactions is obtained.

In one embodiment, at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 a consumer history score is then assigned to each of the potential merchant payees based on the historical financial transaction data analysis.

In one embodiment, the consumer history score of ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 reflects a determined probability that a given potential merchant payee is the payee of the current cash transaction of OBTAIN CASH TRANSACTION ENTRY DATA FROM A CONSUMER OPERATION 303 based on the number, and type, of previously conducted financial transactions with any of the potential merchant payees.

For instance, in one embodiment, if the consumer has previously conducted financial transactions with any of the potential merchant payees, then at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 those potential merchant payees are assigned a higher consumer history score based on the number, and type, of previously conducted financial transactions.

In addition, in one embodiment, if the consumer has previously conducted cash-based financial transactions with any of the potential merchant payees, then at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 those potential merchant payees are assigned an even higher consumer history score.

Similarly, in one embodiment, if the consumer has previously conducted financial transactions having a similar transaction amount to the current cash transaction amount with any of the potential merchant payees, then at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 those potential merchant payees are assigned a higher consumer history score.

In addition, if the consumer has previously conducted cash-based financial transactions having a similar transaction amount to the current cash transaction amount with any of the potential merchant payees, then at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 those potential merchant payees are assigned an even higher consumer history score.

Similarly, in one embodiment, if the consumer has previously conducted financial transactions at a similar time, or on the same day of the week or month, as the current cash transaction with any of the potential merchant payees, then at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 those potential merchant payees are assigned a higher consumer history score.

In addition, in one embodiment, if the consumer has previously conducted cash-based financial transactions at a similar time, or on the same day of the week of month, as the current cash transaction with any of the potential merchant payees, then at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 those potential merchant payees are assigned an even higher consumer history score.

In one embodiment, data representing the consumer history score assigned to each of the potential merchant payees by the consumer history score generation process at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 is then recorded/saved using any method, means, mechanism, process, or procedure for saving data as discussed herein, and/or as known in the art at the time of filing, and/or as developed/made available after the time of filing.

In one embodiment, at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311 the consumer history score is determined and assigned to each of the potential merchant payees based on historical financial transaction data analysis under the direction of one or more processors, such as CPU 121 of FIG. 1, associated with one or more computing systems, such as process system 120 of FIG. 1.

Returning to FIG. 3, in one embodiment, once a consumer history score is determined and assigned to each of the potential merchant payees based on historical financial transaction data analysis at ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311, process flow proceeds to OBTAIN DATA INDICATING PRODUCTS OR SERVICES AND OPERATIONS ASSOCIATED WITH THE GEO-LOCATION MATCHED MERCHANTS OPERATION 313.

In one embodiment, at OBTAIN DATA INDICATING PRODUCTS OR SERVICES AND OPERATIONS ASSOCIATED WITH THE GEO-LOCATION MATCHED MERCHANTS OPERATION 313 products or services and operations data associated with the potential merchant payees of OBTAIN DATA INDICATING MERCHANTS MATCHED TO THE GEO-LOCATION OPERATION 307 is obtained.

In one embodiment, the products or services and operations data associated with the potential merchant payees of OBTAIN DATA INDICATING PRODUCTS OR SERVICES AND OPERATIONS ASSOCIATED WITH THE GEO-LOCATION MATCHED MERCHANTS OPERATION 313 includes, but is not limited to, one or more of, data indicating the products or services offered by the potential merchant payees; data indicating the prices of the products or services offered by the potential merchant payees; data indicating the payment polices of the potential merchant payees, such as data indicating if the potential merchant payees accept cash, or provide products or services typically paid for using cash; data indicating the hours of operation of the potential merchant payees; data indicating days the potential merchant payees are closed, and/or holidays observed by the potential merchant payees; and/or any other products or services and operations data associated with the potential merchant payees available and desired, as discussed herein, and/or as known in the art at the time of filing, and/or as developed/made available after the time of filing.

In one embodiment, the products or services and operations data is obtained at OBTAIN DATA INDICATING PRODUCTS OR SERVICES AND OPERATIONS ASSOCIATED WITH THE GEO-LOCATION MATCHED MERCHANTS OPERATION 313 from one or more merchant databases, websites, networks, or similar locations, as discussed herein, and/or as known in the art at the time of filing, and/or as developed/made available after the time of filing.

In one embodiment, once products or services and operations data associated with the potential merchant payees of OBTAIN DATA INDICATING MERCHANTS MATCHED TO THE GEO-LOCATION OPERATION 307 is obtained at OBTAIN DATA INDICATING PRODUCTS OR SERVICES AND OPERATIONS ASSOCIATED WITH THE GEO-LOCATION MATCHED MERCHANTS OPERATION 313, process flow proceeds to ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315.

In one embodiment, at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315 a products or services score is determined and assigned to each of the potential merchant payees of OBTAIN DATA INDICATING MERCHANTS MATCHED TO THE GEO-LOCATION OPERATION 307.

In one embodiment, at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315 a products or services and operations score generation process is used to analyze the potential merchant payees, i.e., the geo-location matched merchants of OBTAIN DATA INDICATING MERCHANTS MATCHED TO THE GEO-LOCATION OPERATION 307, using the products or services and operations data associated with the potential merchant payees of OBTAIN DATA INDICATING PRODUCTS OR SERVICES AND OPERATIONS ASSOCIATED WITH THE GEO-LOCATION MATCHED MERCHANTS OPERATION 313, and the cash transaction entry data of OBTAIN CASH TRANSACTION ENTRY DATA FROM A CONSUMER OPERATION 303, to determine if the potential merchant payees are likely to accept cash transactions and/or if the cash transaction took place during the hours of operation of the potential merchant payees.

As noted above, in one embodiment, the cash transaction entry data of OBTAIN CASH TRANSACTION ENTRY DATA FROM A CONSUMER OPERATION 303 includes, but is not limited to, any one or more of the time and/or date of the cash transaction, and/or the amount of the cash transaction.

In one embodiment, at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315 a products or services and operations score is then assigned to each of the potential merchant payees based on the products or services and operations analysis. In one embodiment, the products or services and operations score reflects a determined probability that a given potential merchant payee is the payee of the current cash transaction of OBTAIN CASH TRANSACTION ENTRY DATA FROM A CONSUMER OPERATION 303 based on the information contained in the products or services and operations data of OBTAIN DATA INDICATING PRODUCTS OR SERVICES AND OPERATIONS ASSOCIATED WITH THE GEO-LOCATION MATCHED MERCHANTS OPERATION 313.

For instance, in one embodiment, if the products or services and operations data indicates the products or services associated with any of the potential merchant payees are typically not paid for with cash, such as car sales, legal services, accounting services, etc., then at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315 the potential merchant payees concerned are assigned a lower consumer products or services score.

Likewise, in one embodiment, if the products or services and operations data indicates the products or services associated with any of the potential merchant payees are typically paid for with cash, such as food sales, cleaning services, etc., then at ANALYZE THE CASH TRANSACTION ENTRY DATA AND PRODUCTS OR SERVICES AND OPERA-TIONS DATA TO GENERATE PRODUCTS OR SER- VICES AND OPERATIONS SCORE DATA FOR THE GEO-LOCATION MATCHED MERCHANTS OPERATION 315 the potential merchant payees concerned are assigned a higher consumer products or services score.

Similarly, in one embodiment, if the products or services and operations data indicates the potential merchant payees were closed at the time indicated by the cash transaction entry data of OBTAIN CASH TRANSACTION ENTRY DATA FROM A CONSUMER OPERATION 303, then at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315 the potential merchant payees concerned are assigned a lower consumer products or services score, or, in some embodiments, are removed from consideration.

In one embodiment, data representing the products or services score assigned to each of the potential merchant payees by the products or services and operations score generation process is then recorded/saved using any method, means, mechanism, process, or procedure for saving data as discussed herein, and/or as known in the art at the time of filing, and/or as developed/made available after the time of filing.

In one embodiment, at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315 a products or services score is determined and assigned to each of the potential merchant payees under the direction of one or more processors, such as CPU 121 of FIG. 1, associated with one or more computing systems, such as process system 120 of FIG. 1.

Returning to FIG. 3, in one embodiment, once a products or services score is determined and assigned to each of the potential merchant payees of OBTAIN DATA INDICATING MERCHANTS MATCHED TO THE GEO-LOCATION OPERATION 307 at ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315, process flow proceeds to OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317.

In one embodiment, at OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317 historical financial transaction data associated with a community of consumers is obtained.

In one embodiment, the historical community financial transaction data of at OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317 includes, but is not limited to, any of the following data, data indicating payees associated with the community of consumers' historical financial transactions; data indicating payees associated with the community of consumers' historical cash-based financial transactions; data indicating amounts associated with the community of consumers' historical financial transactions; data indicating amounts associated with the community of consumers' historical cash-based financial transactions; data indicating dates and/or times associated with the community of consumers' historical financial transactions; data indicating dates and/or times associated with the community of consumers' historical cash-based financial transactions; and/or any other historical financial transaction data associated with the community of consumers available and desired, as discussed herein, and/or as known in the art at the time of filing, and/or as developed/made available after the time of filing.

In one embodiment, the historical financial transaction data associated with the community of consumers is obtained at OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317 from one or more financial management systems associated with the community of consumers, such as any financial management system, as discussed herein, and/or as known in the art at the time of filing, and/or as developed/made available after the time of filing.

In one embodiment, the historical financial transaction data associated with the community of consumers is obtained at OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317 from one or more consumer community financial data databases. In some embodiments, the one or more consumer community financial data databases are provided the historical financial transaction data associated with the community of consumers, and/or are maintained by, and/or are associated with, one or more financial management systems associated with the community of consumers, such as any financial management system, as discussed herein, and/or as known in the art at the time of filing, and/or as developed/made available after the time of filing.

In one embodiment, once historical financial transaction data associated with the community of consumers is obtained at OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317, process flow proceeds to ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319.

In one embodiment, at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 a community score is determined and assigned to each of the potential merchant payees, i.e., the geo-location matched merchants of OBTAIN DATA INDICATING MERCHANTS MATCHED TO THE GEO-LOCATION OPERATION 307

In one embodiment, at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 a community score generation process is used to analyze the potential merchant payees, i.e., the geo-location matched merchants of OBTAIN DATA INDICATING MERCHANTS MATCHED TO THE GEO-LOCATION OPERATION 307, using the historical community financial transaction data associated with the community of consumers, including consumers other than the consumer, of OBTAIN COMMUNITY FINANCIAL DATA INCLUDING DATA INDICATING HISTORICAL FINANCIAL TRANSACTIONS ASSOCIATED WITH A COMMUNITY OF CONSUMERS OPERATION 317 to identify any previous cash-based transactions involving any of the members of the community of consumers and the potential merchant payees.

In one embodiment, the historical financial transaction data associated with community of consumers is analyzed at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 to determine if any of the members of the community of consumers previously conducted cash-based financial transactions with any of the potential merchant payees, i.e., the geo-location matched merchants.

In one embodiment, if any member of the community of consumers previously conducted cash-based financial transactions with any of the potential merchant payees, the amount, time and date of the previously conducted financial transactions is obtained at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319.

In one embodiment, at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 a community score is then assigned to each of the potential merchant payees based on the community of consumers' historical financial transaction data analysis. In one embodiment, the community score reflects a determined probability that a given potential merchant payee is the payee of the current cash transaction of OBTAIN CASH TRANSACTION ENTRY DATA FROM A CONSUMER OPERATION 303 based on the number, and type, of previously conducted cash-based financial transactions with any of the potential merchant payees.

For instance, in one embodiment, if a member of the community of consumers has previously conducted cash-based financial transactions with any of the potential merchant payees, then at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 those potential merchant payees are assigned a higher community score based on the number, and type, of cash-based financial transactions identified.

In one embodiment, data representing the community score assigned to each of the potential merchant payees by the community score generation process of ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 is then recorded/saved using any method, means, mechanism, process, or procedure for saving data as discussed herein, and/or as known in the art at the time of filing, and/or as developed/made available after the time of filing.

In one embodiment, at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 the community score is determined and assigned to each of the potential merchant payees under the direction of one or more processors, such as CPU 121 of FIG. 1, associated with one or more computing systems, such as process system 120 of FIG. 1.

Returning to FIG. 3, in one embodiment, once a community score generation process is used to determine and assign a community score for each of the potential merchant payees at ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319, process flow proceeds to TRANSFORM AT LEAST PART OF THE CONSUMER HISTORY SCORE, PRODUCTS OR SERVICES AND OPERATIONS SCORE, AND/OR COMMUNITY SCORE DATA FOR THE GEO-LOCATION MATCHED MERCHANTS INTO POTENTIAL MERCHANT PAYEE PROBABILITY SCORE DATA FOR THE GEO-LOCATION MATCHED MERCHANTS OPERATION 321.

In one embodiment, at TRANSFORM AT LEAST PART OF THE CONSUMER HISTORY SCORE, PRODUCTS OR SERVICES AND OPERATIONS SCORE, AND/OR COMMUNITY SCORE DATA FOR THE GEO-LOCATION MATCHED MERCHANTS INTO POTENTIAL MERCHANT PAYEE PROBABILITY SCORE DATA FOR THE GEO-LOCATION MATCHED MERCHANTS OPERATION 321 at least part of the consumer score of ANALYZE THE DATA INDICATING MERCHANTS MATCHED TO THE GEO-LOCATION AND THE CONSUMER FINANCIAL DATA TO GENERATE CONSUMER HISTORY SCORE DATA FOR THE GEO-LOCATION MATCHED MERCHANTS OPERATION 311, and/or the products or services and operations score of ANALYZE THE CASH TRANSACTION ENTRY DATA AND PRODUCTS OR SERVICES AND OPERATIONS DATA TO GENERATE PRODUCTS OR SERVICES AND OPERATIONS SCORE DATA FOR THE GEO-LOCATION MATCHED MERCHANTS OPERATION 315, and/or the community score of ANALYZE THE DATA INDICATING MERCHANTS MATCHED TO THE GEO-LOCATION AND THE COMMUNITY FINANCIAL DATA TO GENERATE COMMUNITY SCORE DATA FOR THE GEO-LOCATION MATCHED MERCHANTS OPERATION 319 assigned to each of potential merchant payees of OBTAIN DATA INDICATING MERCHANTS MATCHED TO THE GEO-LOCATION OPERATION 307 are compiled/added and transformed into a potential merchant payee probability score for each of the potential merchant payees.

In one embodiment, at least part of the consumer history score, and/or the products or services and operations score, and/or the community score assigned to each of potential merchant payees, are compiled/added and transformed into a potential merchant payee probability score for each of the potential merchant payees under the direction of one or more processors, such as CPU 121 of FIG. 1, associated with one or more computing systems, such as process system 120 of FIG. 1.

Returning to FIG. 3, in one embodiment, once at least part of the consumer history score, and/or the products or services and operations score, and/or the community score assigned to each of potential merchant payees, are compiled/added and transformed into a potential merchant payee probability score for each of the potential merchant payees at TRANSFORM AT LEAST PART OF THE CONSUMER HISTORY SCORE, PRODUCTS OR SERVICES AND OPERATIONS SCORE, AND/OR COMMUNITY SCORE DATA FOR THE GEO-LOCATION MATCHED MERCHANTS INTO POTENTIAL MERCHANT PAYEE PROBABILITY SCORE DATA FOR THE GEO-LOCATION MATCHED MERCHANTS OPERATION 321, process flow proceeds to USE AT LEAST PART OF THE POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323.

In one embodiment, at USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 the potential merchant payee probability score for each of the potential merchant payees of TRANSFORM AT LEAST PART OF THE CONSUMER HISTORY SCORE, PRODUCTS OR SERVICES AND OPERATIONS SCORE, AND/OR COMMUNITY SCORE DATA FOR THE GEO-LOCATION MATCHED MERCHANTS INTO COMPLIED PROBABLE PAYEE SCORE DATA FOR THE GEO-LOCATION MATCHED MERCHANTS OPERATION 321 is used to generate a prioritized potential merchant payee list for the cash transaction that includes at least one of the potential merchant payees of OBTAIN DATA INDICATING MERCHANTS MATCHED TO THE GEO-LOCATION OPERATION 307.

In one embodiment, at USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 the potential merchant payee probability score for each of the potential merchant payees is used to generate a prioritized potential merchant payee list for the cash transaction that includes at least one of the potential merchant payees under the direction of one or more processors, such as CPU 121 of FIG. 1, associated with one or more computing systems, such as process system 120 of FIG. 1.

Returning to FIG. 3, in one embodiment, the prioritized potential merchant payee list for the cash transaction of USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 includes only the potential merchant payee with the highest potential merchant payee probability score.

In one embodiment, the prioritized potential merchant payee list for the cash transaction of USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 includes only a designated number of the potential merchant payees with the highest potential merchant payee probability scores; in one embodiment arranged in highest score order.

In one embodiment, the prioritized potential merchant payee list for the cash transaction of USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 includes only the potential merchant payees with a threshold potential merchant payee probability score or greater; in one embodiment arranged in highest score order.

In one embodiment, the prioritized potential merchant payee list for the cash transaction of USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 includes all the potential merchant payees arranged, in one embodiment, in highest score order.

In various embodiments, the prioritized potential merchant payee list of USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323 is arranged in any way, and in any order desired.

In one embodiment, once the potential merchant payee probability score for each of the potential merchant payees is used to generate a prioritized potential merchant payee list for the cash transaction that includes at least one of the potential merchant payees at USE AT LEAST PART OF THE COMPLIED POTENTIAL MERCHANT PAYEE PROBABILITY SCORE DATA FOR THE GEO-LOCATION MATCHED MERCHANTS TO GENERATE PRIORITIZED POTENTIAL MERCHANT PAYEE LIST DATA LISTING ONE OR MORE OF THE GEO-LOCATION MATCHED MERCHANTS OPERATION 323, process flow proceeds to PROVIDE AT LEAST PART OF THE PRIORITIZED POTENTIAL MERCHANT PAYEE LIST DATA TO THE CONSUMER OPERATION 325.

In one embodiment, at PROVIDE AT LEAST PART OF THE PRIORITIZED POTENTIAL MERCHANT PAYEE LIST DATA TO THE CONSUMER OPERATION 325 at least part of the prioritized potential merchant payee list for the cash transaction of USE AT LEAST PART OF THE COMPLIED PROBABLE PAYEE SCORE DATA FOR THE GEO-LOCATION MATCHED MERCHANTS TO GENERATE PRIORITIZED PROBABLE PAYEE LIST DATA LISTING ONE OR MORE OF THE GEO-LOCATION MATCHED MERCHANTS OPERATION 323 is provided to the consumer.

In one embodiment, at PROVIDE AT LEAST PART OF THE PRIORITIZED POTENTIAL MERCHANT PAYEE LIST DATA TO THE CONSUMER OPERATION 325 at least part of the prioritized potential merchant payee list for the cash transaction is provided to the consumer through a mobile computing system associated with the consumer.

In one embodiment, at PROVIDE AT LEAST PART OF THE PRIORITIZED POTENTIAL MERCHANT PAYEE LIST DATA TO THE CONSUMER OPERATION 325 at least part of the prioritized potential merchant payee list for the cash transaction is provided to the consumer through any computing system associated with the consumer, as discussed herein, and/or as known/available in the art at the time of filing, and/or as developed/made available after the time of filing.

In one embodiment, at PROVIDE AT LEAST PART OF THE PRIORITIZED POTENTIAL MERCHANT PAYEE LIST DATA TO THE CONSUMER OPERATION 325 at least part of the prioritized potential merchant payee list for the cash transaction is provided to the consumer, and/or a computing system associated with the consumer, through one or more network locations; e-mail; text message; POTS; or any other communications channel, method, means, mechanism, process, or procedure for providing/transferring data discussed herein, and/or as known/available in the art at the time of filing, and/or as developed/made available after the time of filing.

In one embodiment, at PROVIDE AT LEAST PART OF THE PRIORITIZED POTENTIAL MERCHANT PAYEE LIST DATA TO THE CONSUMER OPERATION 325 at least part of the prioritized potential merchant payee list for the cash transaction of USE AT LEAST PART OF THE COMPLIED PROBABLE PAYEE SCORE DATA FOR THE GEO-LOCATION MATCHED MERCHANTS TO GENERATE PRIORITIZED PROBABLE PAYEE LIST DATA LISTING ONE OR MORE OF THE GEO-LOCATION MATCHED MERCHANTS OPERATION 323 is provided to the consumer and any edits or changes made to the prioritized potential merchant payee list for the cash transaction are recorded and used to improve the accuracy of process 300 for identifying a merchant payee associated with a cash transaction.

In one embodiment, once at least part of the prioritized potential merchant payee list for the cash transaction of USE AT LEAST PART OF THE COMPLIED PROBABLE PAYEE SCORE DATA FOR THE GEO-LOCATION MATCHED MERCHANTS TO GENERATE PRIORITIZED PROBABLE PAYEE LIST DATA LISTING ONE OR MORE OF THE GEO-LOCATION MATCHED MERCHANTS OPERATION 323 is provided to the consumer at PROVIDE AT LEAST PART OF THE PRIORITIZED POTENTIAL MERCHANT PAYEE LIST DATA TO THE CONSUMER OPERATION 325, process flow proceeds to EXIT OPERATION 330.

In one embodiment, at EXIT OPERATION 330, process 300 for identifying a merchant payee associated with a cash transaction is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for identifying a merchant payee associated with a cash transaction discussed above, a consumer is provided a way to more accurately determine, and enter/select, a likely merchant payee associated with a cash transaction based on the consumer's geo-location at the time of the cash transaction; even when there are multiple potential merchant payees near the geo-location associated with the cash transaction. Consequently, using process 300 for identifying a merchant payee associated with a cash transaction, a consumer no longer needs to scroll through a long, un-prioritized, list of all potential merchant payees near the geo-location and then try to select the desired potential merchant payee.

Thus, process 300 for identifying a merchant payee associated with a cash transaction provides the consumer with a significant advantage, particularly in high density locations like shopping malls and buildings that can include a significant number of potential merchant payees near the geo-location associated with the cash transaction, and when using mobile computing systems, such as smart phones, that are not particularly well suited to scrolling lists and selecting data from a large set of possible choices.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer program product for identifying a merchant payee associated with a cash transaction comprising:
    a nontransitory computer readable medium;
    and computer program code, encoded on the computer readable medium, comprising computer readable instructions which, when executed via any set of one or more processors, perform the following:
        obtaining cash transaction entry data indicating a consumer has conducted a cash transaction with an unidentified merchant, the cash transaction data being obtained from the consumer and including at least a date and time indicating when the cash transaction took place;
        obtaining geo-location data from a mobile device of the consumer, the geo location data indicating an approximate location of the consumer at the time of the cash transaction as reflected in the cash transaction data;
        obtaining geo-location and merchant matching data indicating two or more potential merchant payees located within a defined radius of the approximate location of the consumer at the time of the cash transaction;
        obtaining historical financial transaction data associated with a community of consumers, the historical financial transaction data associated with the community of consumers including data indicating cash-based transactions conducted by members of the community of consumers with at least one of the two or more potential merchant payees; and
        analyzing at least part of the merchant matching data and the historical financial transaction data associated with the community of consumers to determine a potential merchant payee probability score for each of the two or more potential merchant payees.

2. The computer program product for identifying a merchant payee associated with a cash transaction of claim 1 wherein at least part of the historical financial transaction data associated with the community of consumers is obtained from a financial management system.

3. The computer program product for identifying a merchant payee associated with a cash transaction of claim 1 further comprising computer program code, encoded on the computer readable medium, comprising computer readable instructions which, when executed via any set of one or more processors, perform the following:
    using the potential merchant payee probability score for each of the two or more potential merchant payees to, at least in part, generate a prioritized potential merchant payee list for the cash transaction input data that includes at least one of the two or more potential merchant payees.

4. A computer program product for identifying a merchant payee associated with a cash transaction comprising:
    a nontransitory computer readable medium;
    and computer program code, encoded on the computer readable medium, comprising computer readable instructions which, when executed via any set of one or more processors, perform the following:
        obtaining cash transaction entry data indicating a consumer has conducted a cash transaction with an unidentified merchant, the cash transaction data being obtained from the consumer and including at least a date and time indicating when the cash transaction took place;
        obtaining geo-location data from a mobile device of the consumer, the geo location data indicating an approximate location of the consumer at the time of the cash transaction as reflected in the cash transaction data;
        obtaining geo-location and merchant matching data indicating two or more potential merchant payees located within a defined radius of the approximate location of the consumer at the time of the cash transaction;
        obtaining products or services and operations data associated with the two or more potential merchant payees; and
        analyzing the geo-location data, the merchant matching data and the products or services and operations data to determine, at least in part, a potential merchant payee probability score for each of the two or more potential merchant payees.

5. The computer program product for identifying a merchant payee associated with a cash transaction of claim 4 wherein the products or services and operations data includes products or services and operations data selected from the group consisting of:
   data indicating the products or services offered by at least one of the potential merchant payees;
   data indicating the prices of the products or services offered by at least one of the potential merchant payees;
   data indicating the payment polices of at least one of the potential merchant payees;
   data indicating the hours of operation of at least one of the potential merchant payees; and
   data indicating days at least one of the potential merchant payees are closed or holidays observed by at least one of the potential merchant payees;
   or any combination thereof.

6. The computer program product for identifying a merchant payee associated with a cash transaction of claim 4 wherein at least part of the products or services and operations data is obtained from a network location associated with at least one of the two or more potential merchant payees.

7. The computer program product for identifying a merchant payee associated with a cash transaction of claim 4 further comprising computer program code, encoded on the computer readable medium, comprising computer readable instructions which, when executed via any set of one or more processors, perform the following:
   using the potential merchant payee probability score for each of the two or more potential merchant payees to, at least in part, generate a prioritized potential merchant payee list for the cash transaction input data that includes at least one of the two or more potential merchant payees.

8. A computer program product for identifying a merchant payee associated with a cash transaction comprising:
   a nontransitory computer readable medium;
   and computer program code, encoded on the computer readable medium, comprising computer readable instructions which, when executed via any set of one or more processors, perform the following:
   obtaining cash transaction entry data indicating a consumer has conducted a cash transaction with an unidentified merchant, the cash transaction data being obtained from the consumer and including at least a date and time indicating when the cash transaction took place;
   obtaining geo-location data from a mobile device of the consumer, the geo location data indicating an approximate location of the consumer at the time of the cash transaction as reflected in the cash transaction data;
   obtaining geo-location and merchant matching data indicating two or more potential merchant payees located within a defined radius of the approximate location of the consumer at the time of the cash transaction;
   obtaining historical financial transaction data associated with the consumer;
   obtaining products or services and operations data associated with the two or more potential merchant payees;
   obtaining historical financial transaction data associated with a community of consumers, the historical financial transaction data associated with the community of consumers including data indicating cash-based transactions conducted by members of the community of consumers involving at least one of the two or more potential merchant payees; and
   analyzing at least part of the merchant matching data, historical financial transaction data associated with the consumer, the products or services and operations data, and the historical financial transaction data associated with the community of consumers to determine, a potential merchant payee probability score for each of the two or more potential merchant payees.

9. The computer program product for identifying a merchant payee associated with a cash transaction of claim 8 wherein at least part of the historical financial transaction data associated with the consumer is obtained from a financial management system.

10. The computer program product for identifying a merchant payee associated with a cash transaction of claim 8 wherein at least part of the historical financial transaction data associated with the community of consumers is obtained from a financial management system.

11. The computer program product for identifying a merchant payee associated with a cash transaction of claim 8 wherein the products or services and operations data includes products or services and operations data selected from the group consisting of:
   data indicating the products or services offered by at least one of the potential merchant payees;
   data indicating the prices of the products or services offered by at least one of the potential merchant payees;
   data indicating the payment polices of at least one of the potential merchant payees;
   data indicating the hours of operation of at least one of the potential merchant payees; and
   data indicating days at least one of the potential merchant payees are closed or holidays observed by at least one of the potential merchant payees;
   or any combination thereof.

12. The computer program product for identifying a merchant payee associated with a cash transaction of claim 8 wherein at least part of the products or services and operations data is obtained from a network location associated with at least one of the two or more potential merchant payees.

13. The computer program product for identifying a merchant payee associated with a cash transaction of claim 8 further comprising computer program code, encoded on the computer readable medium, comprising computer readable instructions which, when executed via any set of one or more processors, perform the following:
   using the potential merchant payee probability score for each of the two or more potential merchant payees to, at least in part, generate a prioritized potential merchant payee list for the cash transaction input data that includes at least one of the two or more potential merchant payees.

14. A system for identifying a merchant payee associated with a cash transaction comprising:
   at least one processor; and
   at least one memory coupled to the at least one processor, the at least one memory having stored therein instructions which when executed by any set of the one or more processors, perform a process for identifying a merchant payee associated with a cash transaction, the process for identifying a merchant payee associated with a cash transaction including:
   obtaining cash transaction entry data indicating a consumer has conducted a cash transaction with an unidentified merchant, the cash transaction data being obtained from the consumer and including at least a date and time indicating when the cash transaction took place;
   obtaining geo-location data from a mobile device of the consumer, the geo location data indicating an approximate location of the consumer at the time of the cash transaction as reflected in the cash transaction data;

obtaining geo-location and merchant matching data indicating two or more potential merchant payees located within a defined radius of the approximate location of the consumer at the time of the cash transaction;

obtaining historical financial transaction data associated with a community of consumers, the historical financial transaction data associated with the community of consumers including data indicating cash-based transactions conducted by members of the community of consumers with at least one of the two or more potential merchant payees; and analyzing at least part of the merchant matching data and the historical financial transaction data associated with the community of consumers to determine a potential merchant payee probability score for each of the two or more potential merchant payees.

15. The system for identifying a merchant payee associated with a cash transaction of claim 14 wherein at least part of the historical financial transaction data associated with the community of consumers is obtained from a financial management system.

16. The system for identifying a merchant payee associated with a cash transaction of claim 14 wherein the process for identifying a merchant payee associated with a cash transaction further comprises:

using the potential merchant payee probability score for each of the two or more potential merchant payees to, at least in part, generate a prioritized potential merchant payee list for the cash transaction input data that includes at least one of the two or more potential merchant payees.

17. A system for identifying a merchant payee associated with a cash transaction comprising:

at least one processor; and at least one memory coupled to the at least one processor, the at least one memory having stored therein instructions which when executed by any set of the one or more processors, perform a process for identifying a merchant payee associated with a cash transaction, the process for identifying a merchant payee associated with a cash transaction including:

obtaining cash transaction entry data indicating a consumer has conducted a cash transaction with an unidentified merchant, the cash transaction data being obtained from the consumer and including at least a date and time indicating when the cash transaction took place;

obtaining geo-location data from a mobile device of the consumer, the geo location data indicating an approximate location of the consumer at the time of the cash transaction as reflected in the cash transaction data;

obtaining geo-location and merchant matching data indicating two or more potential merchant payees located within a defined radius of the approximate location of the consumer at the time of the cash transaction;

obtaining products or services and operations data associated with the two or more potential merchant payees; and analyzing the geo-location data, the merchant matching data and the products or services and operations data to determine, at least in part, a potential merchant payee probability score for each of the two or more potential merchant payees.

18. The system for identifying a merchant payee associated with a cash transaction of claim 17 wherein the products or services and operations data includes products or services and operations data selected from the group consisting of:

data indicating the products or services offered by at least one of the potential merchant payees;

data indicating the prices of the products or services offered by at least one of the potential merchant payees;

data indicating the payment polices of at least one of the potential merchant payees;

data indicating the hours of operation of at least one of the potential merchant payees; and data indicating days at least one of the potential merchant payees are closed or holidays observed by at least one of the potential merchant payees;

or any combination thereof.

19. The system for identifying a merchant payee associated with a cash transaction of claim 17 wherein at least part of the products or services and operations data is obtained from a network location associated with at least one of the two or more potential merchant payees.

20. The system for identifying a merchant payee associated with a cash transaction of claim 17 wherein the process for identifying a merchant payee associated with a cash transaction further comprises:

using the potential merchant payee probability score for each of the two or more potential merchant payees to, at least in part, generate a prioritized potential merchant payee list for the cash transaction input data that includes at least one of the two or more potential merchant payees.

21. A system for identifying a merchant payee associated with a cash transaction comprising:

at least one processor; and at least one memory coupled to the at least one processor, the at least one memory having stored therein instructions which when executed by any set of the one or more processors, perform a process for identifying a merchant payee associated with a cash transaction, the process for identifying a merchant payee associated with a cash transaction including:

obtaining cash transaction entry data indicating a consumer has conducted a cash transaction with an unidentified merchant, the cash transaction data being obtained from the consumer and including at least a date and time indicating when the cash transaction took place;

obtaining geo-location data from a mobile device of the consumer, the geo location data indicating an approximate location of the consumer at the time of the cash transaction as reflected in the cash transaction data;

obtaining geo-location and merchant matching data indicating two or more potential merchant payees located within a defined radius of the approximate location of the consumer at the time of the cash transaction;

obtaining historical financial transaction data associated with the consumer;

obtaining products or services and operations data associated with the two or more potential merchant payees;

obtaining historical financial transaction data associated with a community of consumers, the historical financial transaction data associated with the community of consumers including data indicating cash-based transactions conducted by members of the community of consumers with at least one of the two or more potential merchant payees; and analyzing at least part of the merchant matching data, historical financial transaction data associated with the consumer, the products or services and operations data, and the historical financial transaction data associated with the community of consumers to determine a potential merchant payee probability score for each of the two or more potential merchant payees.

22. The system for identifying a merchant payee associated with a cash transaction of claim 21 wherein at least part of the historical financial transaction data associated with the consumer is obtained from a financial management system.

23. The system for identifying a merchant payee associated with a cash transaction of claim 21 wherein at least part of the historical financial transaction data associated with the community of consumers is obtained from a financial management system.

24. The system for identifying a merchant payee associated with a cash transaction of claim 21 wherein the products or services and operations data includes products or services and operations data selected from the group consisting of:
data indicating the products or services offered by at least one of the potential merchant payees;
data indicating the prices of the products or services offered by at least one of the potential merchant payees;
data indicating the payment polices of at least one of the potential merchant payees;
data indicating the hours of operation of at least one of the potential merchant payees; and
data indicating days at least one of the potential merchant payees are closed or holidays observed by at least one of the potential merchant payees;
or any combination thereof.

25. The system for identifying a merchant payee associated with a cash transaction of claim 21 wherein at least part of the products or services and operations data is obtained from a network location associated with at least one of the two or more potential merchant payees.

26. The system for identifying a merchant payee associated with a cash transaction of claim 21 wherein the process for identifying a merchant payee associated with a cash transaction further comprises:
using the potential merchant payee probability score for each of the two or more potential merchant payees to, at least in part, generate a prioritized potential merchant payee list for the cash transaction input data that includes at least one of the two or more potential merchant payees.

* * * * *